(12) United States Patent  
Leetaru et al.

(10) Patent No.: US 7,716,352 B2
(45) Date of Patent: May 11, 2010

(54) METHOD AND SYSTEM FOR RETRIEVING INFORMATION USING AN AUTHENTICATION WEB PAGE

(75) Inventors: Kalev Leetaru, Urbana, IL (US); Alan Craig, Peoria, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1599 days.

(21) Appl. No.: 10/830,869

(22) Filed: Apr. 23, 2004

(65) Prior Publication Data

US 2005/0240864 A1 Oct. 27, 2005

(51) Int. Cl.
*G06F 15/16* (2006.01)
*H04L 9/32* (2006.01)

(52) U.S. Cl. ............................. 709/229; 726/2; 726/3; 726/4; 726/5; 709/225

(58) Field of Classification Search ................. 726/2–4; 709/225, 229
See application file for complete search history.

(56) References Cited

U.S. PATENT DOCUMENTS

| | | | |
|---|---|---|---|
| 5,983,227 A | 11/1999 | Nazem et al. | |
| 5,991,760 A * | 11/1999 | Gauvin et al. | 707/10 |
| 6,061,686 A * | 5/2000 | Gauvin et al. | 707/10 |
| 6,101,539 A * | 8/2000 | Kennelly et al. | 709/223 |
| 6,327,628 B1 | 12/2001 | Anuff et al. | |
| 6,360,254 B1 * | 3/2002 | Linden et al. | 709/219 |
| 6,412,008 B1 * | 6/2002 | Fields et al. | 709/228 |
| 6,434,619 B1 * | 8/2002 | Lim et al. | 709/229 |
| 6,546,397 B1 | 4/2003 | Rempell | |
| 6,732,181 B2 * | 5/2004 | Lim et al. | 709/229 |
| 7,000,184 B2 * | 2/2006 | Matveyenko et al. | 715/530 |
| 7,222,363 B2 * | 5/2007 | Rice et al. | 726/5 |
| 7,356,834 B2 * | 4/2008 | Smith et al. | 726/2 |
| 2002/0007409 A1 * | 1/2002 | Rode | 709/227 |
| 2002/0073125 A1 | 6/2002 | Bier | |

(Continued)

FOREIGN PATENT DOCUMENTS

JP 2003036237 2/2003

(Continued)

OTHER PUBLICATIONS

"Netscape Composer," Pat Pecoy, 2000, 14 pages http://facweb.furman.edu/~pecoy/mfl195/composer.

(Continued)

*Primary Examiner*—Aaron Strange
(74) *Attorney, Agent, or Firm*—Perkins Coie LLP

(57) ABSTRACT

An editing system that allows a user, when browsing the web, to select a web page, which is currently being viewed, to be edited. When a user navigates to a web page that the user can edit, the editing system displays an appropriate indication that the page can be edited. When the user selects to edit the currently displayed web page, the editing system enters an editing mode that allows the user to edit the web page within a browsing context. When in editing mode, the editing system may enable various toolbars and buttons within the window of the browser to facilitate the editing. When the user has completed the editing of the web page, the editing system automatically updates the web page at the web site.

26 Claims, 19 Drawing Sheets

U.S. PATENT DOCUMENTS

| | | | |
|---|---|---|---|
| 2002/0078140 A1* | 6/2002 | Kelly et al. | 709/203 |
| 2002/0166066 A1* | 11/2002 | Haji et al. | 713/201 |
| 2002/0169866 A1* | 11/2002 | Lim et al. | 709/223 |
| 2003/0009567 A1* | 1/2003 | Farouk | 709/229 |
| 2003/0023632 A1* | 1/2003 | Ries et al. | 707/513 |
| 2003/0204810 A1 | 10/2003 | Dam et al. | |
| 2004/0054898 A1* | 3/2004 | Chao et al. | 713/168 |
| 2004/0117732 A1 | 6/2004 | McNeill et al. | |
| 2004/0210662 A1* | 10/2004 | Lim et al. | 709/229 |
| 2004/0217985 A9* | 11/2004 | Ries et al. | 345/740 |
| 2004/0225672 A1* | 11/2004 | Landers et al. | 707/102 |
| 2004/0267613 A1* | 12/2004 | Chan et al. | 705/14 |
| 2005/0138554 A1 | 6/2005 | Bell et al. | |
| 2005/0229101 A1* | 10/2005 | Matveyenko et al. | 715/530 |
| 2006/0123330 A1 | 6/2006 | Horiuchi et al. | |
| 2006/0130131 A1* | 6/2006 | Pai et al. | 726/9 |
| 2007/0289004 A1* | 12/2007 | Chao et al. | 726/9 |

FOREIGN PATENT DOCUMENTS

| | | |
|---|---|---|
| KR | 2001015981 | 3/2001 |
| WO | WO/0051018 | 8/2000 |

OTHER PUBLICATIONS

"Amaya Overview," INRIA and W3C, 1994-2005, 4 pages http://www.w3.org/Amaya/Amaya.html [accessed Aug. 23, 2005].

"Apple.Mac," Apple Computer, Inc., 2005, 4 pages http://www.mac.com/1/iTour/tour_homepage.html [accessed Aug. 23, 2005] http://www.mac.com/WebObjects/Welcome.woa?aff=consumer&cty=US&lang=en [accessed Aug. 23, 2005].

"Bloki integrates Web hosting, blogs, forums, and online collaboration," Zapatec, Inc., 3 pages http://www.bloki.com [accessed Aug. 23, 2005].

"Web Authoring with Browser-based editors," Ektron, Inc., 2005, 2 pages http://www.ektron.com/web-content-editors.aspx [ accessed Aug. 23, 2005].

"Macromedia Contribute 3", Macromedia, Inc., 2005, 2 pages.

Eddleman, H., "How to use Netscape Navigator ver 3.0 Gold," 1997, 4 pages http://www.disknet.com/indiana_biolab/w49.htm [accessed Aug. 23, 2005] http://www.wesleyan.edu/its/web/gold/toolguide.html [accessed Aug. 23, 2005].

"WebEasel," OJC Technologies, 2003, 14 pages http://www.webeasel.net [accessed Aug. 23, 2005].

"What is Wiki," Jun. 27, 2002, 1 page http://wiki.org/wiki.cgi?WhatIsWiki [accessed Aug. 23, 2005].

"NPACI Rocks Cluster Distribution: Users Guide: User's Guide for NPACI Rocks version 4.0.0 Edition," UC Regents, 2005, 113 pages.

* cited by examiner

METHOD AND SYSTEM FOR RETRIEVING INFORMATION USING AN AUTHENTICATION WEB PAGE

CROSS REFERENCE TO RELATED APPLICATION

This application is related to U.S. patent application Ser. No. 10/830,865, filed Apr. 23, 2004, entitled METHOD AND SYSTEM FOR EDITABLE WEB BROWSING, which is incorporated herein by reference in its entirety.

TECHNICAL FIELD

The described technology relates generally to browsing the web and in particular to editing web pages.

BACKGROUND

Today's computer networking environments, such as the Internet, offer mechanisms for delivering documents between heterogeneous computer systems. One such network, the World Wide Web network, which comprises a subset of Internet sites, supports a standard protocol for requesting and receiving documents known as web pages. This protocol is known as the Hypertext Transfer Protocol ("HTTP"). HTTP defines a high-level message passing protocol for sending and receiving packets of information between diverse applications. Details of HTTP can be found in various documents, including T. Berners-Lee et al., *Hypertext Transfer Protocol—HTTP* 1.0, Request for Comments (RFC) 1945, MIT/LCS, May 1996. Each HTTP message follows a specific layout that includes, among other information, a header that contains information specific to the request or response. Further, each HTTP request message contains a universal resource identifier ("URI") that specifies to which network resource the request is to be applied. A URI is either a Uniform Resource Locator ("URL") or a Uniform Resource Name ("URN") or any other formatted string that identifies a network resource. The URI contained in a request message, in effect, identifies the destination machine for a message. URLs, as an example of URIs, are discussed in detail in T. Berners-Lee et al., *Uniforn Resource Locators* (URL), RVC 1738, CERN, Xerox PARC, Univ. of Minn., December 1994.

A browser application enables users to navigate among web servers on the web network by requesting and receiving web pages. For the purposes of this discussion, a web page is any type of document that can be served by a web server. These documents can be in various formats such as an HTML format, an XHTML format, a word processing format (e.g., Microsoft Word), a spreadsheet format (e.g., Microsoft Excel), a presentation format (e.g., Microsoft PowerPoint), a portable document format (e.g., Adobe PDF), and so on. The HTML format is a document markup language, defined by the Hypertext Markup Language ("HTML") specification. HTML defines tags for specifying how to interpret the text and images stored in an HTML document. For example, there are HTML tags for defining paragraph formats and for emboldening and underlining text. In addition, the HTML format defines tags for adding images to documents and for formatting and aligning text with respect to images. HTML tags appear between angle brackets, for example, <HTML>. Further details of HTML are discussed in T. Berners-Lee and D. Connolly, *Hypertext Markup Language*-2.0, RFC 1866, MIT/W3C, November 1995.

A web browser application executes on a client computer, which communicates with a web server by sending and receiving HTTP messages. The web browser "navigates" to new locations on the network to browse (display) what is available at these locations. (A collection of web pages at a location (e.g., hosted by the same web server) is referred to as a "web site.") In particular, when the web browser "navigates" to a new location, it requests a new document from the new location (e.g., the web server) by sending an HTTP request message using any well-known underlying communications protocol. The HTTP request message follows the specific layout discussed above, including a header and a URI field that specifies the network location to which to apply the request. When the web server specified by URI receives the HTTP request message, it interprets the message and sends a return message to the source location that originated the message in the form of an HTTP response message. In addition to the standard features of an HTTP message such as the header, the HTTP response message contains the requested HTML document. When the HTTP response message reaches the client computer, the web browser application extracts the HTML document from the message and parses and interprets (executes) the HTML code in the document to display the document on a display screen of the client computer as specified by the HTML tags.

The creation and maintenance of web pages can be a time-consuming task. Many tools are available to assist in the creation of web pages, which are defined by HTML documents. Web site administrators use these tools to define the layout of a web page, the content to be dynamically added to a web page, links to other web pages, and so on. When an administrator wants to modify a web page, the administrator may use the same tools to generate a revised HTML document.

Some web sites create all their HTML documents dynamically, based on content stored in a database. For example, a news web site may store all its articles in a database along with information describing the layout of each web page. When the news web site is accessed, the page layout description along with its content is retrieved from the database and an HTML document is created. These web sites may use a content management system to manage the layout description and content. Some content management systems provide special-purpose editors to assist users in managing the information stored in the database.

Although these tools for creating and maintaining web pages generally operate on offline copies of an entire web site, some of these tools allow users to browse to a live web page and select to edit that web page. Such tools are referred to as "online" editors. One browser provides an online editor that is launched in a separate window for modifying the definition of the web page currently been viewed. That editor provides a what-you-see-is-what-you-get ("WYSIWYG") metaphor that allows images from the remote computer system to be added to the definition of the web page. When editing of the web page is complete, a user can select a publish button and enter appropriate publication information for updating the definition of the web page at the web site. The publication information may include the URL of the web page, user name and password, title of web page, and so on.

Current tools for creating and maintaining web pages have several disadvantages. First, these tools often do not provide any indication of whether a web page that is currently being displayed by a browser can be edited by the user. Thus, to find out whether a web page is editable, a user may try to edit the web page. If the web page is not editable, the user finds out when an error message is displayed. Second, these tools typically perform the editing process in a window that is separate from the window used for browsing. As such, the user is forced to shift to an editing context, rather than simply editing in a browsing context. Third, after the editing of the web page is complete, a user typically publishes the web page so that the edited web page is stored at the web site. To publish the edited web page, a user may need to use a separate tool from the browser and editor to identify which URLs are linked to which directories at the web site. Alternatively, some tools may allow a web site administrator to provide a file to a user that maps URLs to directories. After using that tool, the user enters the destination directory into a publication window of the editor so that the edited web page can be uploaded and stored at the appropriate location of the web site. It would be desirable to have a technique for editing web pages that would overcome these disadvantages.

DETAILED DESCRIPTION

Figure 1:
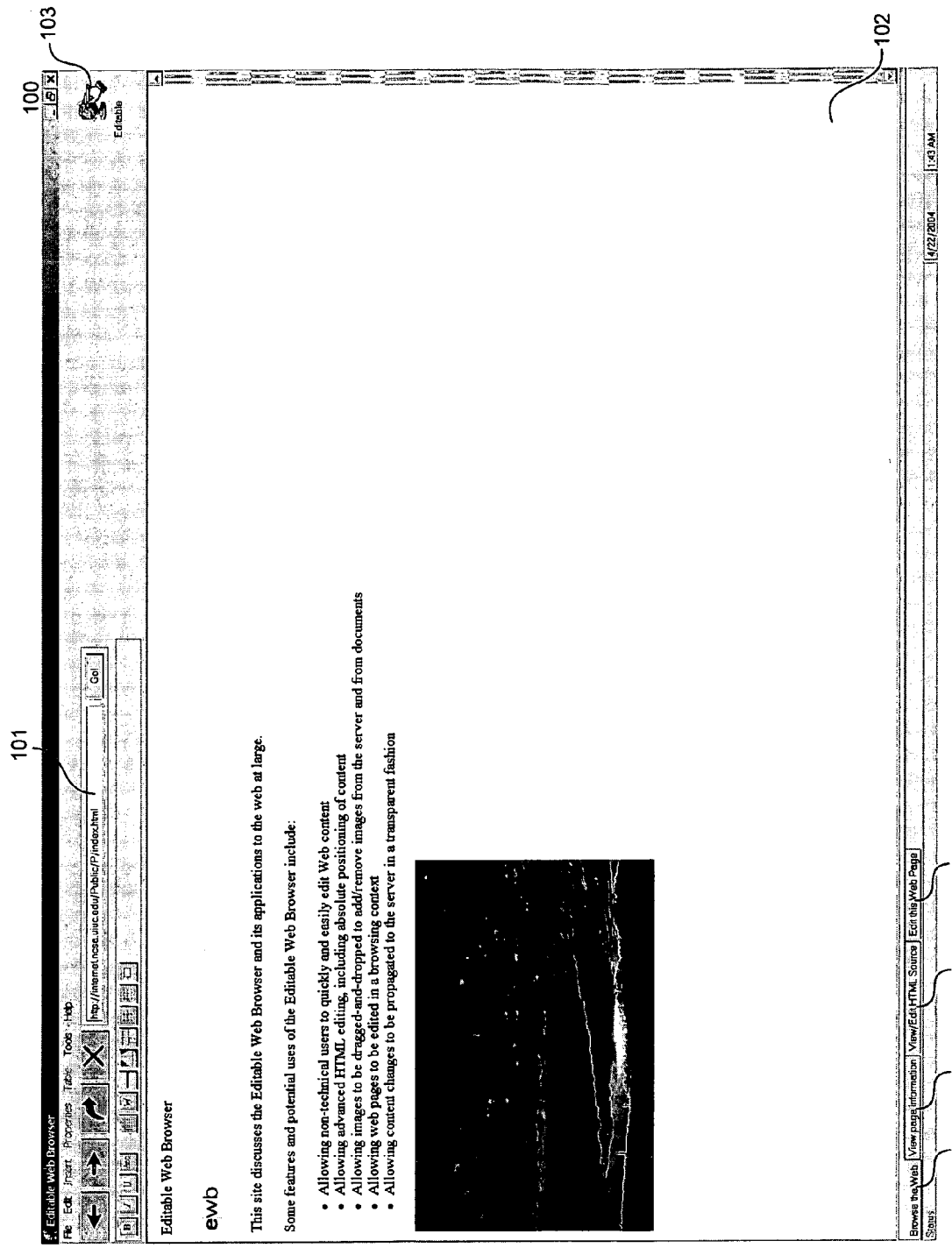
FIG. 1 is a display that illustrates displaying of a web page that is editable in one embodiment.

A method and system for editing web pages is provided. In one embodiment, an editing system allows a user, when browsing the web, to select for editing a web page that is currently being viewed. When a user navigates to a web page that the user can edit, the editing system displays an appropriate indication that the page can be edited. When the user selects to edit the currently displayed web page, the editing system enters an editing mode that allows the user to edit the web page within a browsing context. When in editing mode, the editing system may enable various toolbars and buttons within the window of the browser to facilitate the editing. When the user has completed the editing of the web page, the editing system automatically updates the web page at the web site so that the updated web page can be provided when a user navigates to that web page using the editing system or a conventional browser. In this way, a user can identify whether a web page is editable before attempting to edit it, can edit a web page in a browsing context, and does not need to know web site-specific location information when saving a web page to its web site.

In one embodiment, the editing system includes a server component that executes at a server computer and a client component that executes at a client computer. The client component includes an editable web browser component that interacts with a browsing component and an editing component to allow users to browse to and edit web pages. The client component maintains an indication of which web pages users of the client computer can edit. When a server provides a requested web page to the client computer, the editable web browser component checks to see whether the user has edit rights to that web page. If so, the editable web browser component displays to the user an indication that the web page is editable and uses the browsing component to display the web page. When the user selects to edit the web page, the editable web browser component uses the editing component to control the editing of the web page within a browsing context. Before allowing the user to edit the web page, the editable web browser component notifies the server component of the server that provided the web page that the user wants to edit the web page. The server component checks whether another user is currently editing the web page. If the web page is currently being edited by another user, the server component returns an error message to the editable web browser component so that it can notify the user and stay in the browse mode. Otherwise, the server component notifies the editable web browser component that the web page can be edited. The editable web browser component requests the server component to provide a list of images that are available to be used with the web page. The editable web browser component allows the user to edit the text of the web page, to remove images from the web page, and to add images from a list of available images. The editable web browser component may allow the user to add images to and remove images from the list. When the editing is complete, the editable web browser component retrieves client-side configuration information that specifies how to save the edited web page to the web site. The client-side configuration information may include the domain URL of the web site and an update URL of an update component of the server component. The editable web browser component identifies the update URL for the domain of the edited web page from the configuration information (which identifies the server component), packages the edited web page along with any new images, and sends a request to update the edited web page to the update URL. Upon receiving the update request directed to the update URL, the server component updates that web page in accordance with the update package.

The editing system may use various techniques to ensure that only authorized users are allowed to edit web pages. The editing system may require that users authenticate to the server before editing a web page. A web site administrator can provide each user with their authentication information (e.g., user name and password). The server component may require each edit-related request (e.g., request to edit a web page and request to update a web page) to include the authentication information. Alternatively, after authenticating the user, the server could provide the client component with an authentication certificate that is included with subsequent edit-related requests for that web page. The authentication certificate could be stored in a cookie. As another alternative, after the user is authenticated, the server can establish a secure session between the server and the client computer so that all edit-related requests can be sent securely (e.g., HTTPS). To keep up-to-date with servers, the editable web browser component may periodically (e.g., each time it is started) contact each server to which it (or a user) can authenticate to and request an update of web pages that are editable. The editable web browser component can then update its client-side configuration file accordingly.

The editing system may use various techniques to provide authentication information to users. With one technique, a web site administrator provides the authentication information directly to an authorized user (e.g., via an electronic mail message). The user then supplies the authentication information to the editable web browser component for storage in a configuration file in association with the web site. With another technique, when the web site administrator adds a new authorized user, the server component creates a user-specific authentication web page with some randomly generated name or that is accessible only by the user (e.g., stored in a special directory that has an access control mechanism). That authentication web page contains information that the editable web browser component can use to automatically update the configuration file with the authentication information of the user. The web site administrator provides to the user (e.g., via an electronic mail message) a link to the authentication web page. When the server provides the authentication web page to the client computer (e.g., after the user selects the link), the editable web browser component recognizes the authentication web page (e.g., by a special HTML tag that it contains) and updates the configuration file based on information stored in the web page (e.g., identified by a special HTML tag).

In one embodiment, an authentication web page may be used to allow retrieval of arbitrary information from a server. The authentication web page may contain authentication information along with a URL to a server. When the editable web browser component (or some other system) receives an authentication web page, it can retrieve the authentication information and the URL from the web page. The component can then use the authentication information to authenticate to the server identified by the URL. The component can use the URL to request information from the server. For example, in the editable browsing context, the component may request that the server provide the identification of the editable web pages. Upon receiving the identifications, the component can store them locally. More generally, an authentication web page can be used to provide authentication information for a server to a client-side component, which can then use the authentication information to access a server. If the web page is HTML-based, then an HTML tag can be used to identify the authentication information and the URL. In this way, information can be automatically provided to a client computer when a user browses to an authentication web page.

In one embodiment, the editing system may allow web pages to be edited by anyone who can access the web pages. The server component may add authentication information to such a web page along with information describing the server component. When the editable web browser component receives such a web page, it would recognize that the web page is not identified in the configuration file as being editable. The editable web browser component would then recognize that the web page is editable by its content (e.g., by a special HTML tag that it contains) and retrieves authentication information and server information from its content. The editable web browser component can then use that information when editing the web page. Thus, a web site administrator could specify that a certain web page can be edited by anyone who has access to the web page.

FIG. 1 is a display that illustrates displaying of a web page that is editable in one embodiment. A window 100 includes a web page URL field 101, a web page display area 102, an editable web page indicator 103, and buttons 104-107. The web page URL field indicates the URL of the web page currently being displayed in the display area. The editable web page indicator indicates whether the user has rights to edit the currently displayed web page. The edit web page button 104 allows the user to enter an editing mode for editing the currently displayed web page. The view/edit HTML source button 105 allows the user to view and edit the HTML source for this web page. The view page information button 106 allows the user to view information relating to the organization of this web page, such as the hierarchy of HTML tags that define the web page. The browse button 107 is enabled when the user is in editing mode to allow the user to enter browsing mode.

Figure 2:
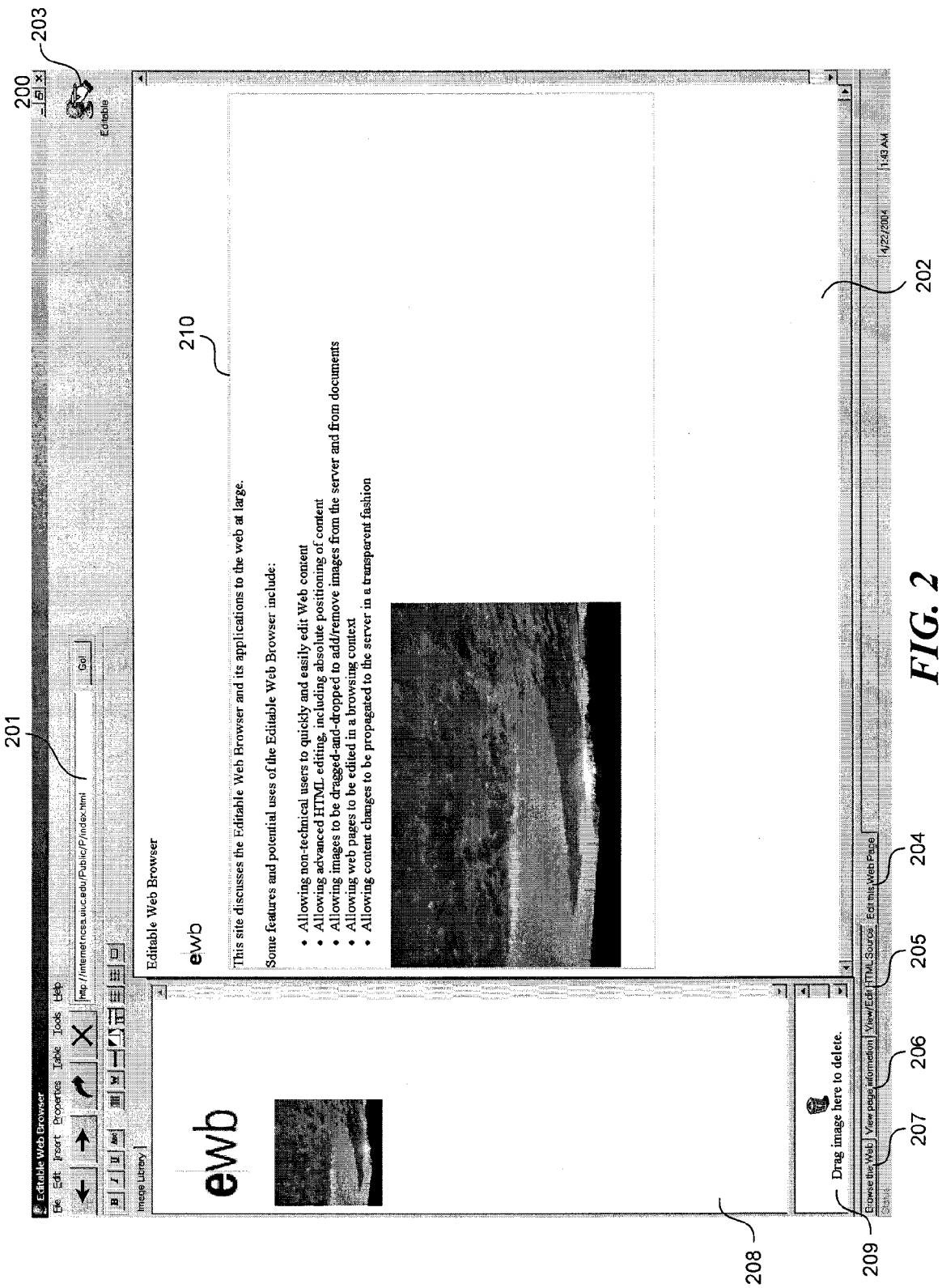
FIG. 2 is a display that illustrates displaying of a web page when in editing mode in one embodiment.

FIG. 2 is a display that illustrates displaying of a web page when in editing mode in one embodiment. The editing system enters the editing mode when the user selects the edit this web page button of FIG. 1. A window 200 includes a web page URL field 201, an edit area 202, an editable web page indicator 203, buttons 204-207, an image area 208, and an image delete area 209. The editing system illustrates table 210 of the web page by showing the borders around the elements of the table. The edit this web page button is disabled, and the other buttons are enabled. The editing system allows a user to edit the web page, for example, using conventional editing techniques such as copy-and-paste, drag-and-drop, and so on. The image area contains each of the images that are available to be included in this web page. A user can delete images from the web page by selecting an image and entering a delete command. A user can add an image to the web page by dragging one of the available images from the image area to the edit area. A user can add to the list of available images by, for example, dragging and dropping an image from their desktop into the image area. A user can delete an available image by selecting it from the image area and entering a delete command or by dragging and dropping it in the image delete area. When the web page is updated at the web site, the server component may update its list of available images to correspond to those shown in the image area.

Figure 3:
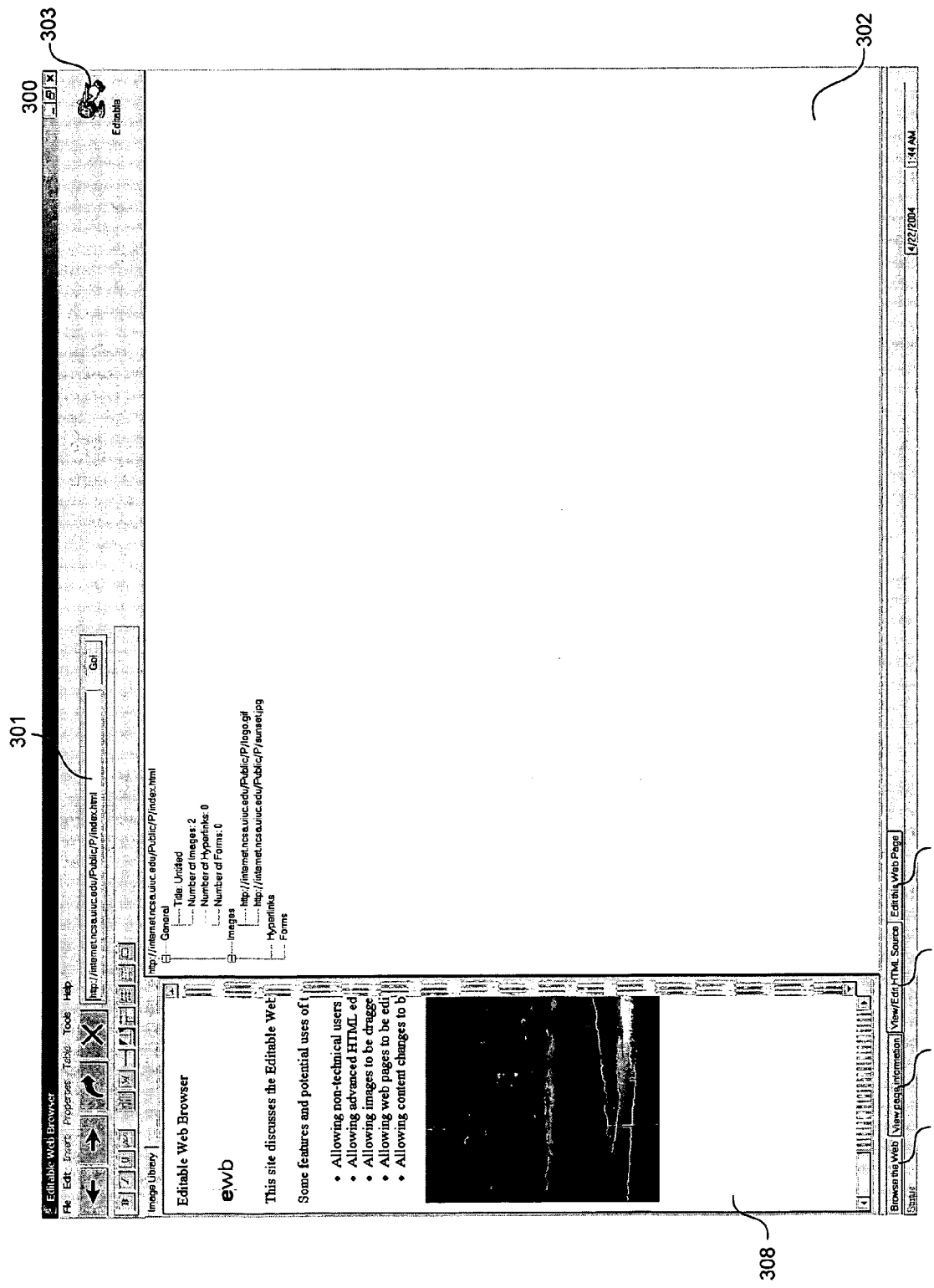
FIG. 3 is a display that illustrates displaying of a web page when in view page information mode in one embodiment.

FIG. 3 is a display that illustrates displaying of a web page when in view page information mode in one embodiment. The editing system displays this after the user selects the view page information button of FIG. 2. A window 300 includes a web page URL field 301, a page information area 302, an editable web page indicator 303, buttons 304-307, and a display area 308. The view page information button is disabled, and the other buttons are enabled. The display area contains the display of the web page. The page information area contains information about this web page, including an indication of the hierarchical organization of the HTML source of the web page.

Figure 4:
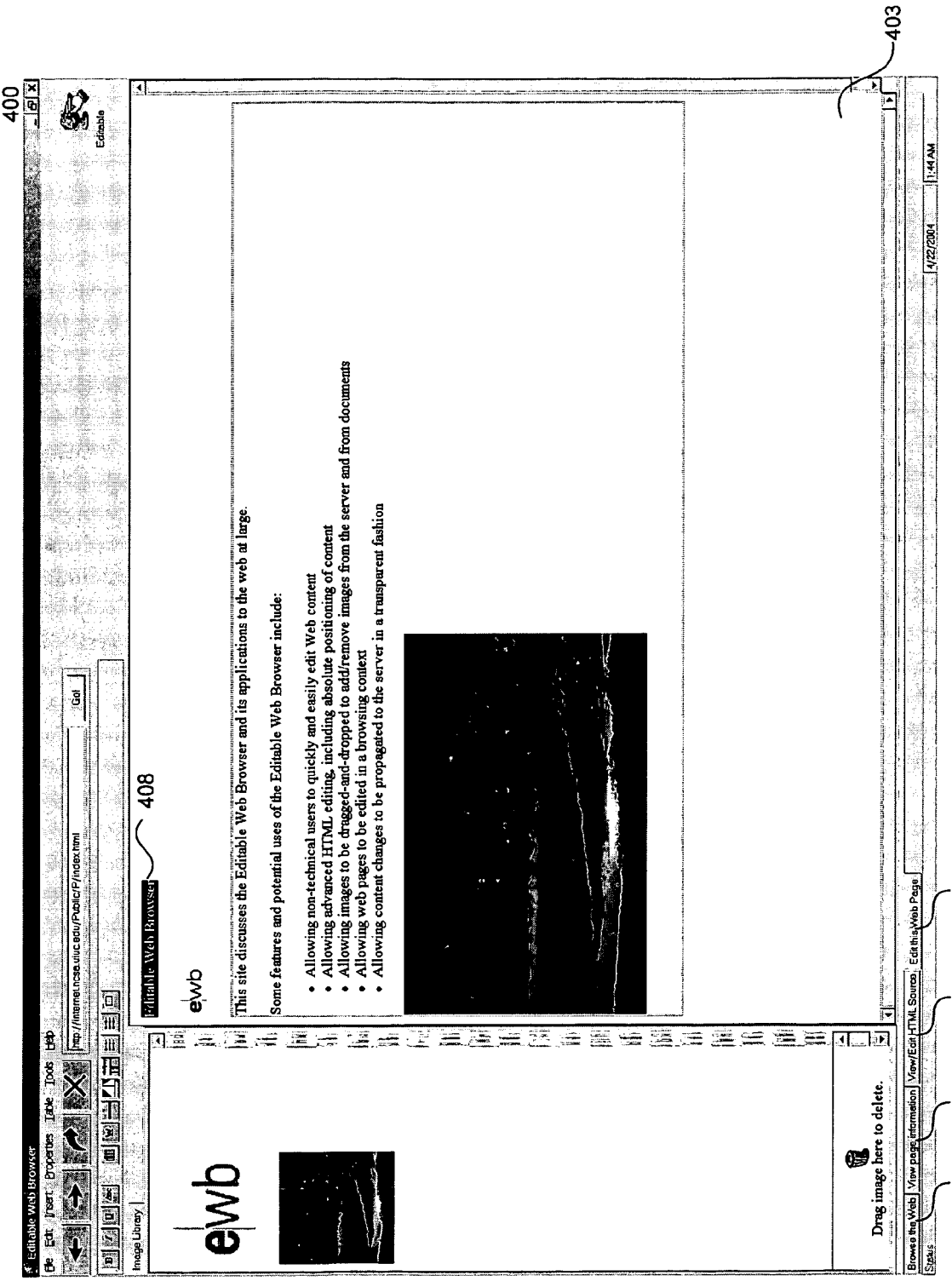
FIG. 4 is a display that illustrates displaying of a web page when a portion of a web page is selected for editing in one embodiment.
Figure 5:
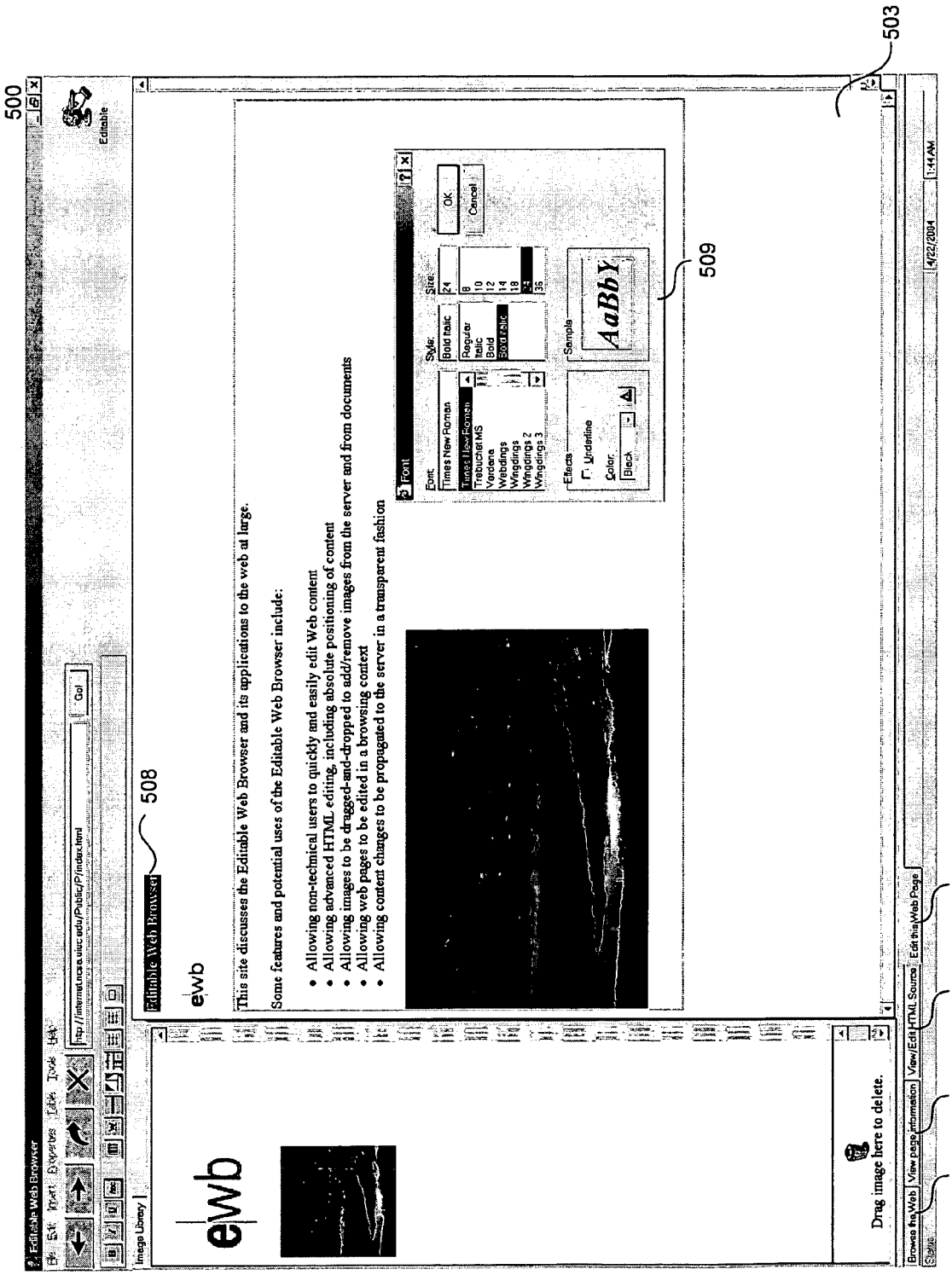
FIG. 5 is a display that illustrates displaying of a web page when a portion of the web page is being edited in one embodiment.
Figure 6:
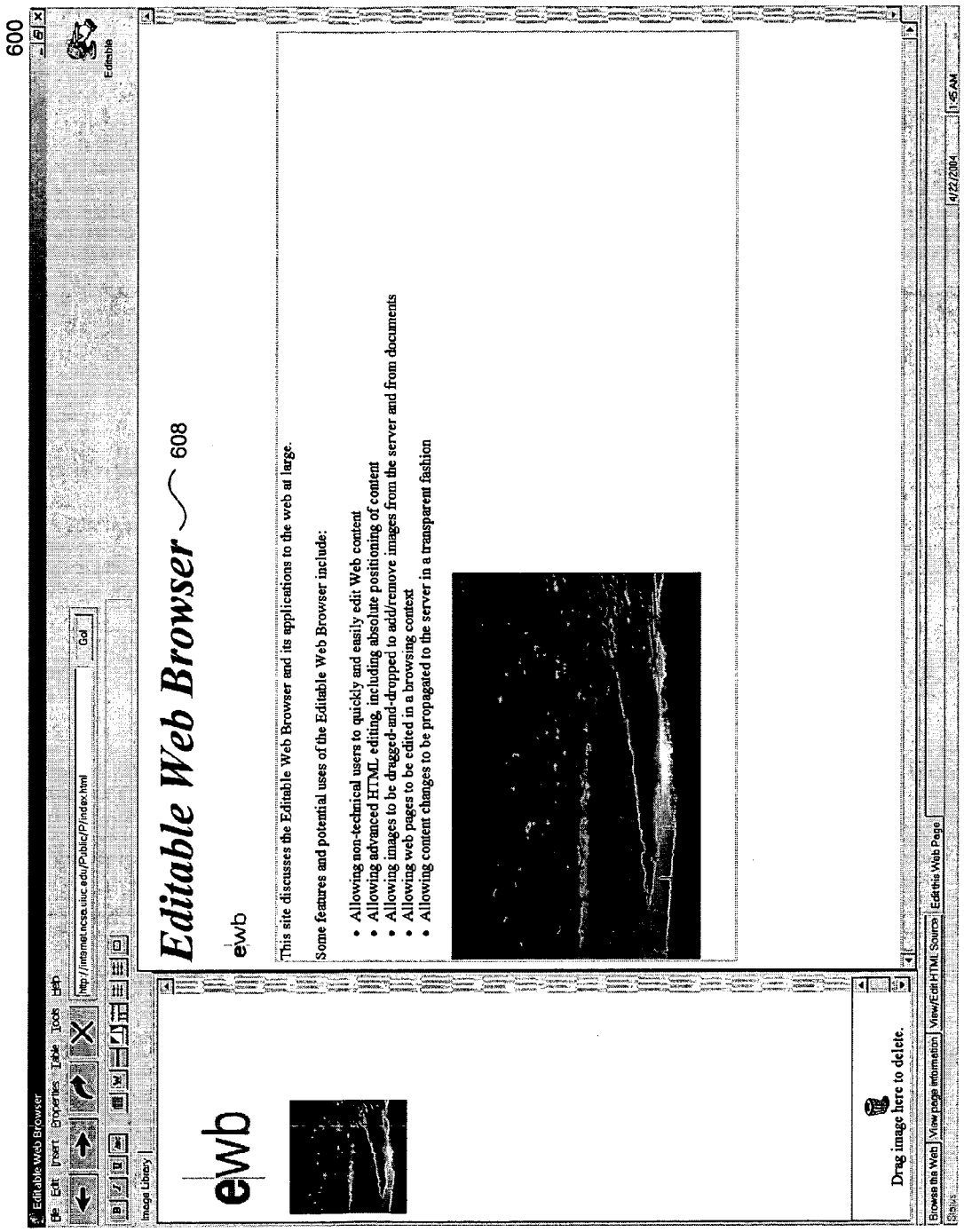
FIG. 6 is a display that illustrates displaying of a web page with text that has been edited by a user in one embodiment.
Figure 7:
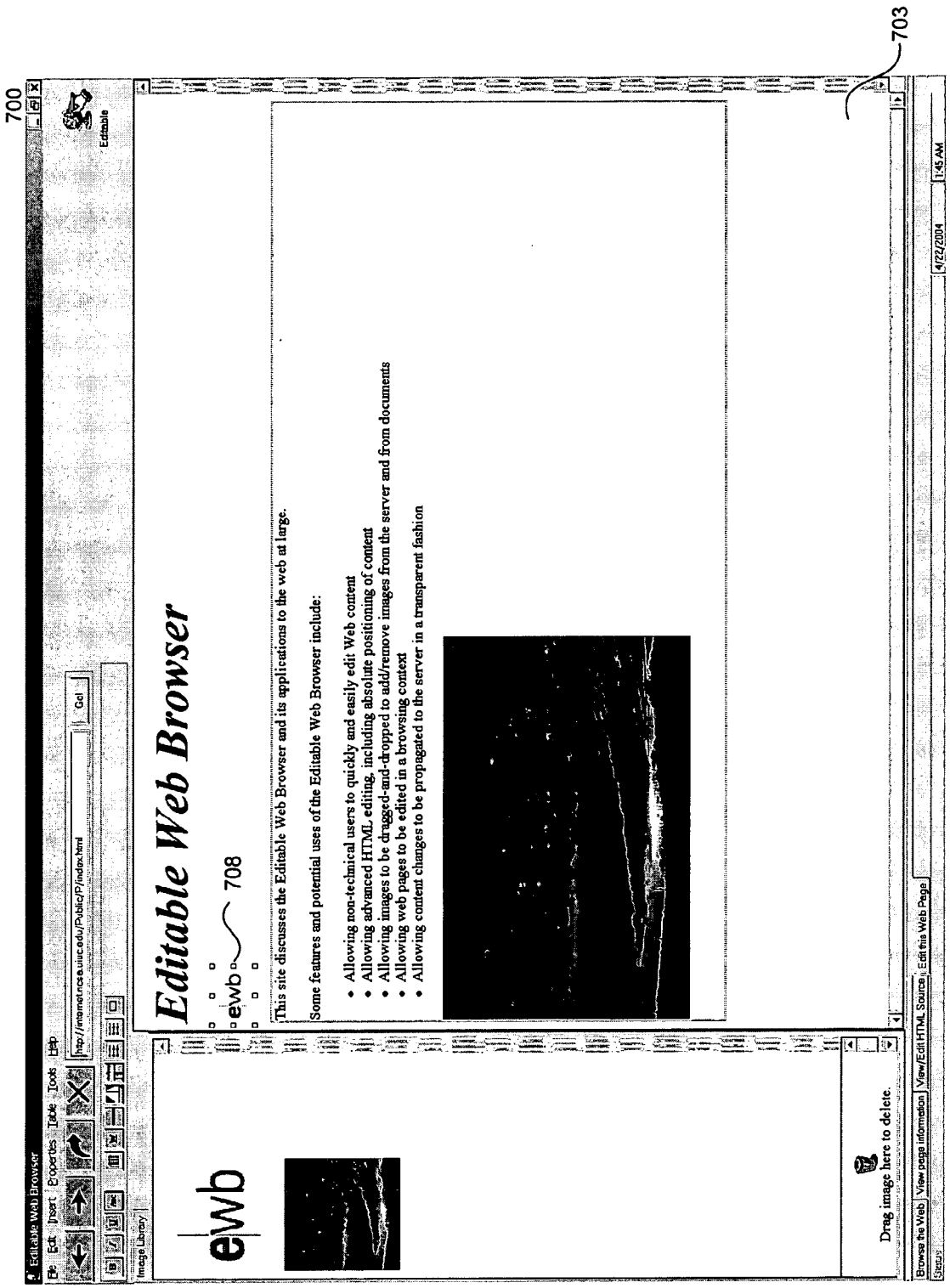
FIG. 7 is a display that illustrates displaying of a web page when an image of the web page is selected in one embodiment.
Figure 8:
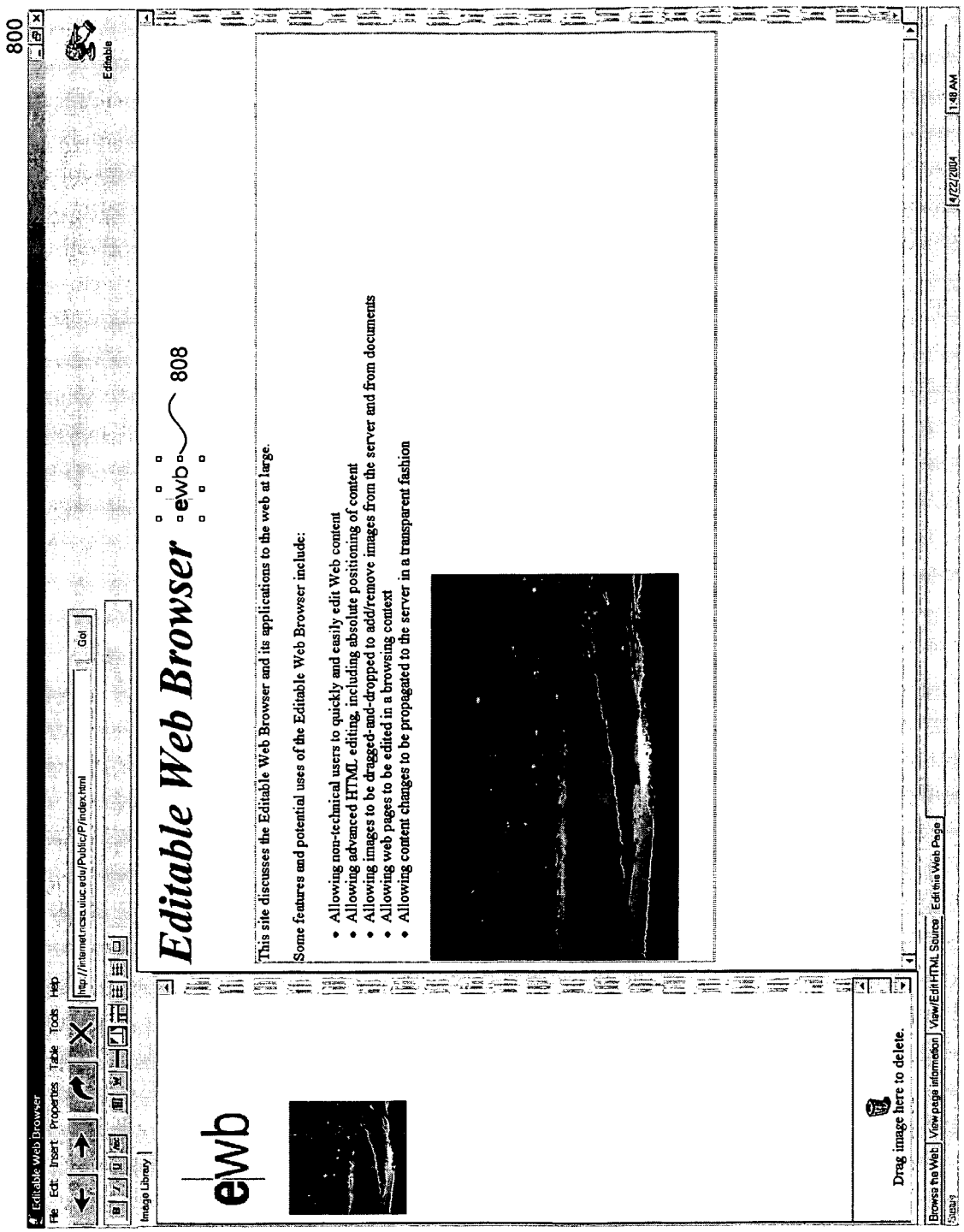
FIG. 8 is a display that illustrates displaying of a web page after a user has moved images of the web page in one embodiment.

FIGS. 4-8 are displays that illustrate the editing of a web page in one embodiment. FIG. 4 is a display that illustrates displaying of a web page when a portion of a web page is selected for editing in one embodiment. The display 400 includes web page display area 403 and buttons 404-407. The highlighted area 408 indicates that the user has selected text to edit. When in editing mode, the editing system may enable conventional word processing features for modifying the content of the web page. The word processing feature may include a WYSIWYG display of the web page as it is edited. FIG. 5 is a display that illustrates displaying of a web page when a portion of the web page is being edited in one embodiment. A window 500 includes a web page display area 503, buttons 504-507, a highlighted area 509, and a font dialog box 509. The font dialog box may be displayed after a user selects to edit the font of the text of the highlighted area. The font dialog box operates on the selected text in a conventional manner. FIG. 6 is a display that illustrates displaying of a web page with text that has been edited by a user in one embodiment. A window 600 includes web page display area and edited portion 608. In this example, the user specified to change the text style, size, and color of the selected portion as indicated by dialog box 509. FIG. 7 is a display that illustrates displaying of a web page when an image of the web page is selected in one embodiment. A window 700 includes an edit area 703 and a selected image 708. The selected image is shown with its edit handles highlighted. FIG. 8 is a display that illustrates displaying of a web page after a user has moved an image of the web page in one embodiment. The display 800 includes edit area and image 808 relocated within the web page.

Figure 9:
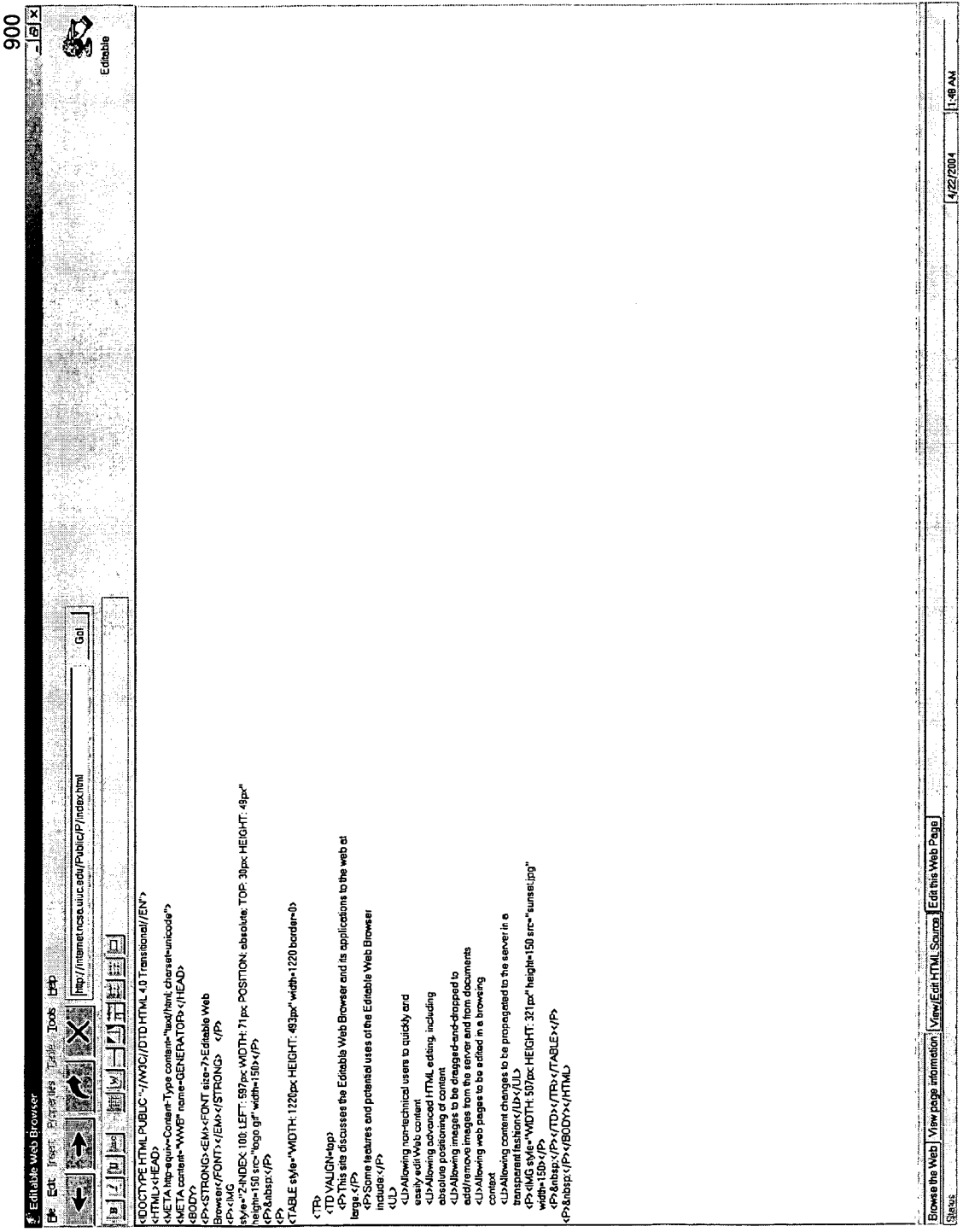
FIG. 9 is a display that illustrates displaying of the HTML source of a web page in one embodiment.

FIG. 9 is a display that illustrates displaying of the HTML source of a web page in one embodiment. A display 900 includes a display area that contains the HTML source of this web page. The editing system allows the HTML source to be edited directly using a conventional word processor or an HTML-specific editor. The user may edit the HTML source by changing the text in the display area.

Figure 10:
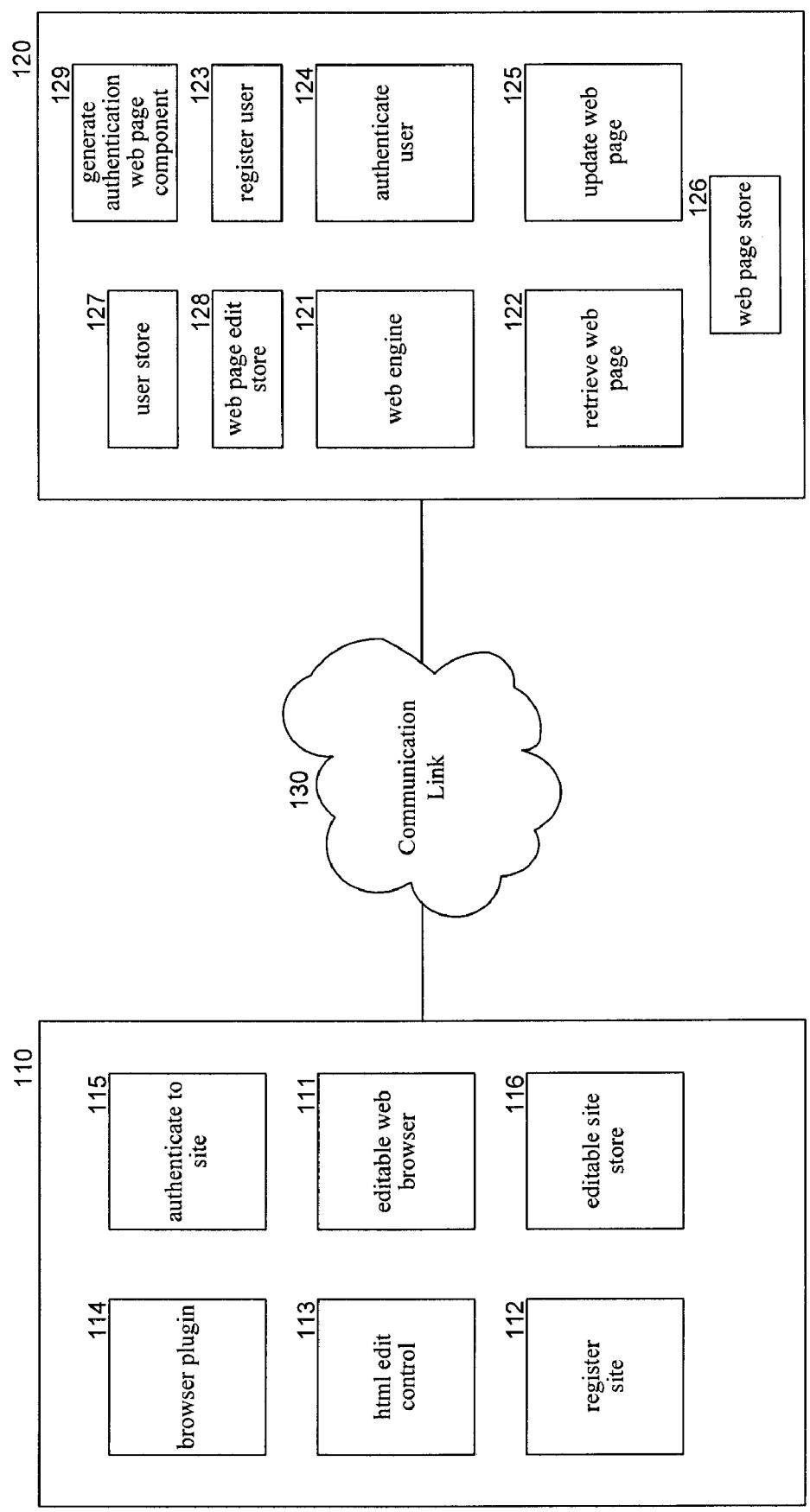
FIG. 10 is a block diagram that illustrates components of the editing system in one embodiment.

FIG. 10 is a block diagram that illustrates components of the editing system in one embodiment. The editing system includes a client component 110, which executes on a user computer system, and a server component 120, which executes on a server computer for a web site, interconnected via a communications link 130. The client component includes an editable web browser component 111, a register site component 112, an HTML edit control 113, a browser plug-in 114, an authenticate-to-site component 115, and an editable site store 116. The editable web browser component invokes the register site component, the HTML edit control, the browser plug-in, and the authenticate-to-site component to implement the editing system. When in browsing mode, the editable web browser component invokes the browser plug-in, which may be a conventional control provided by a provider of a browser application, to control the browsing through web pages of various web sites. When a web page is received that the user can edit, the editable web browser component displays within its window an indication that the user can edit the currently displayed web page. The editable web browser component receives various events indicating user interactions such as selection of the edit this web page button, the view/edit HTML source button, the view page information button, and the browse the web button.

One skilled in the art will appreciate that the selection of an action (e.g., to edit a web page) by a user can be performed in various ways other than by selecting buttons. For example, the editing system may provide menus of actions, may allow users to click on a web page to edit it, and so on. When the browse the web button has been selected, the editable web browser component invokes the browser plug-in to control browsing the web. When the edit this web page button is selected, the editable web browser component enters the editing mode and invokes the HTML edit control. The HTML edit control may be a conventional control provided by a provider of an HTML editor application.

Although not shown in FIG. 10, the editing system may have different edit controls for the different types of web pages that can be displayed. For example, the editing system may include a word processing control to control the editing of word processing documents or a spreadsheet control to control the editing of spreadsheet documents. One skilled in the art will appreciate that the browser plug-in and the HTML edit control can be provided through different modes of a single control. The editable site store contains a mapping from web site domains to update URLs through which web pages of those domains can be updated. The editable site store also contains authentication information (e.g., user name and password) for use in authenticating a user to the web site. When an edited web page is to be saved at its web site, the editable web browser component invokes the authenticate-to-site component to authenticate the user to the web site. Alternatively, the editable web browser component may include the authentication information in every edit-related request sent to a server. The editable web browser component packages an edited web page (including any newly added available images of the web page) and sends the package in an HTTP request message to the update URL indicated in the editable site store. The editable web browser component uses the register site component to allow a user to maintain the configuration information of the editable site store.

The editable web browser component also allows users to add new web pages to a web site. A user can select a new page option (e.g., via a menu item). The editable web browser component then prompts the user for the URL of the web page. The editable web browser component then sends an edit-related request to the server to add the web page. The user can then browse to that URL and define the contents of the web page, which may initially be blank, a copy of an existing page, or based on a default template.

The server component of the editing system includes a web engine 121, a retrieve web page component 122, a register user component 123, an authenticate user component 124, an update web page component 125, a web page store 126, a user store 127, a web page edit store 128, and a generate authentication web page component 129. The web engine receives requests to retrieve web pages, to update web pages, and to perform other tasks as described below. When a request to retrieve a web page is received, the web engine invokes the retrieve web page component to retrieve the web page from the web page store, and sends a response to the request that includes the web page. The web page edit store may contain an access control list for each web page that can be edited. The access control list identifies those users who can edit each web page. When an edit-related request is received, the web engine authenticates the user by invoking the authentication component and then invoking the edit web page component to handle the request. When the request is to update a web page, the edit web page component may update the web page store with the HTML source for the web page, and update the available images based on the information in the update package. The register user component is used by a web site administrator to maintain authentication information for the users in the user store and maintain edit rights for the users to the web pages in the web page edit store. The generate authentication web page component includes generating for a user an authentication web page that includes authentication information that is not displayed. One skilled in the art will appreciate that requests from a browser to access a web page that is editable can be handled by a web server that is not part of the editing system. When a user requests to edit a web page, the server component can receive and process the request. Thus, traffic to the server component is limited to edit-related requests, and does not include requests to access a web page.

The computing device on which the editing system is implemented may include a central processing unit, memory, input devices (e.g., keyboard and pointing devices), output devices (e.g., display devices), and storage devices (e.g., disk drives). The memory and storage devices are computer-readable media that may contain instructions that implement the editing system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 10 illustrates an example of a suitable operating environment in which the editing system may be implemented. The operating environment is only one example of a suitable operating environment and is not intended to suggest any limitation as to the scope of use or functionality of the editing system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The editing system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 11:
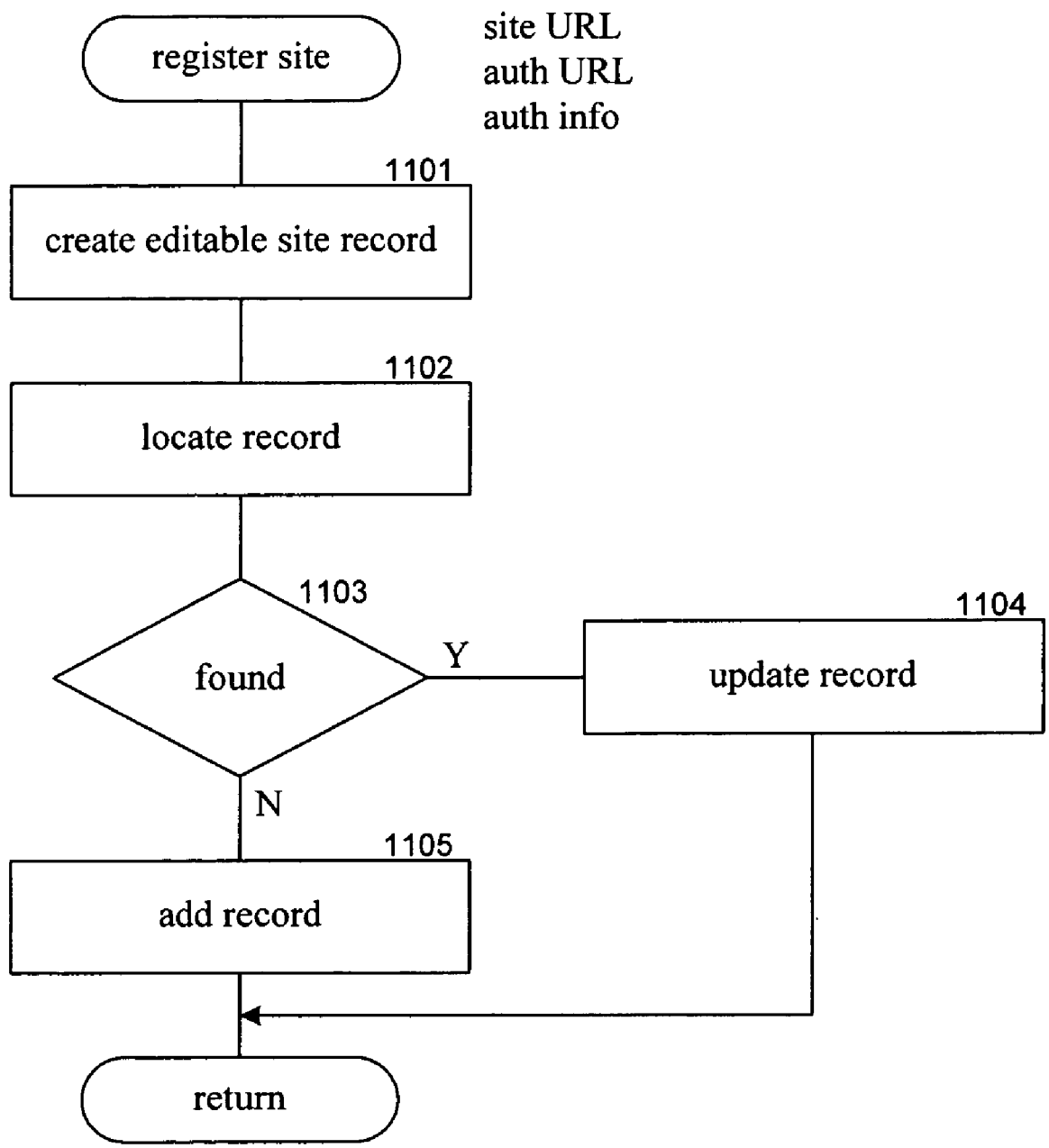
FIG. 11 is a flow diagram that illustrates the processing of a register site component of the client component in one embodiment.

FIG. 11 is a flow diagram that illustrates the processing of a register site component of the client component in one embodiment. The component is passed an indication of a web site URL, an update URL, and authentication information. The component updates the editable site store based on the passed information. The component may be invoked by a user interface component that receives the URLs and authentication information from a user, an editable web browser component that detects when a user browses to an authentication web page, and so on. In block 1101, the component creates a record for the editable site store. In block 1102, the component attempts to locate a record in the editable site store for the passed web site URL. In decision block 1103, if the record was located, then the component continues at block 1104, else the component continues at block 1105. In block 1104, the component updates the located record based on the created record and then returns. In block 1105, the component adds the created record to the editable site store and then returns.

Figure 12:
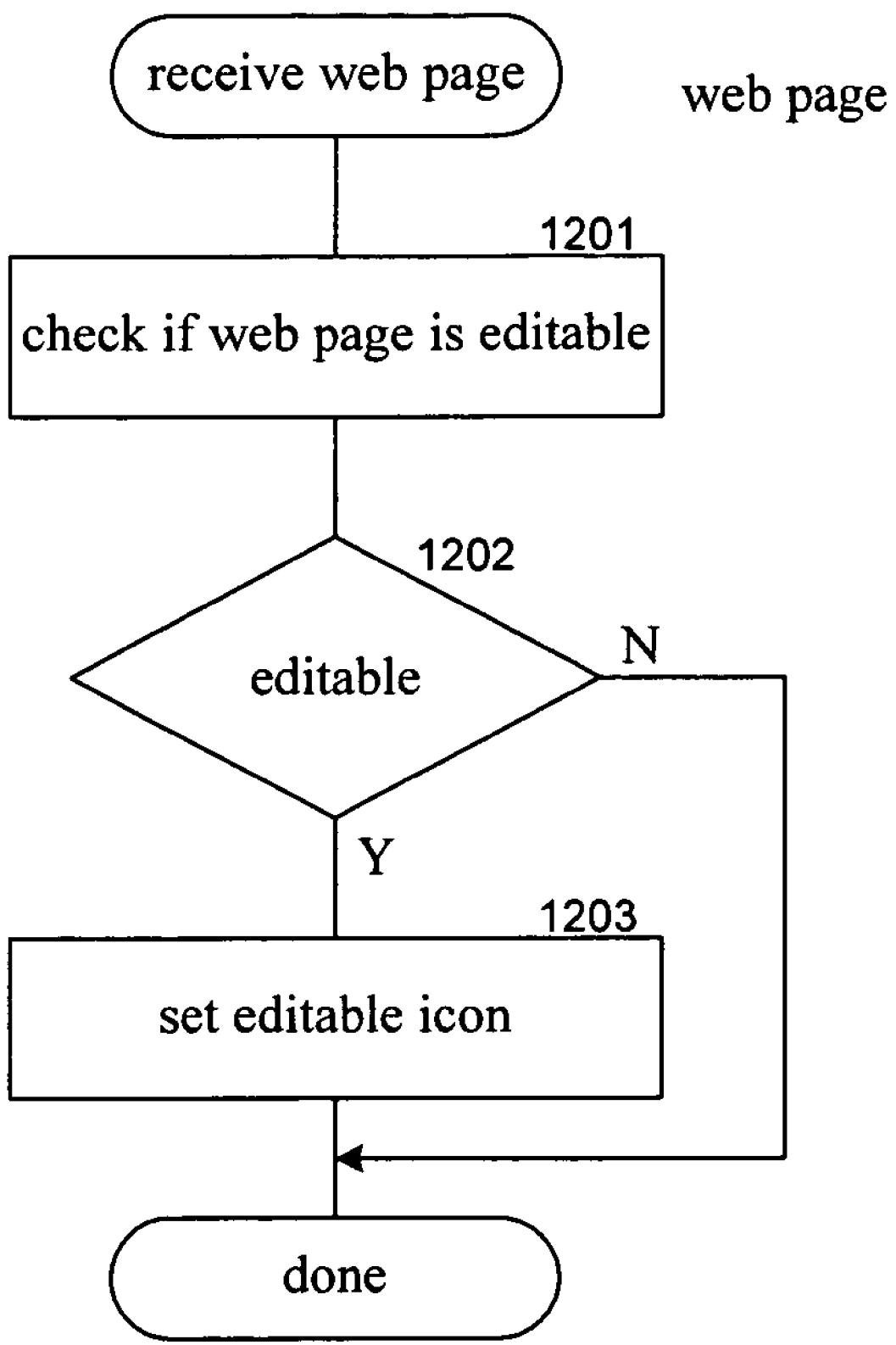
FIG. 12 is a flow diagram that illustrates the processing of a receive editable web page component of the client component in one embodiment.

FIG. 12 is a flow diagram that illustrates the processing of a receive editable web page component of the client component in one embodiment. This component may be invoked upon receipt of web pages and may check whether the web pages are editable. If editable, the component may set an editable web page indicator. The component can determine whether a web page is editable in various ways. For example, the component can access client-side configuration information indicating which web pages are editable for each web site. In decision block 1202, if the web page is editable, the component continues at block 1203, else the component completes. In block 1203, the component sets an edit icon so that the user will know that the user can edit this web page and then completes.

Figure 13:
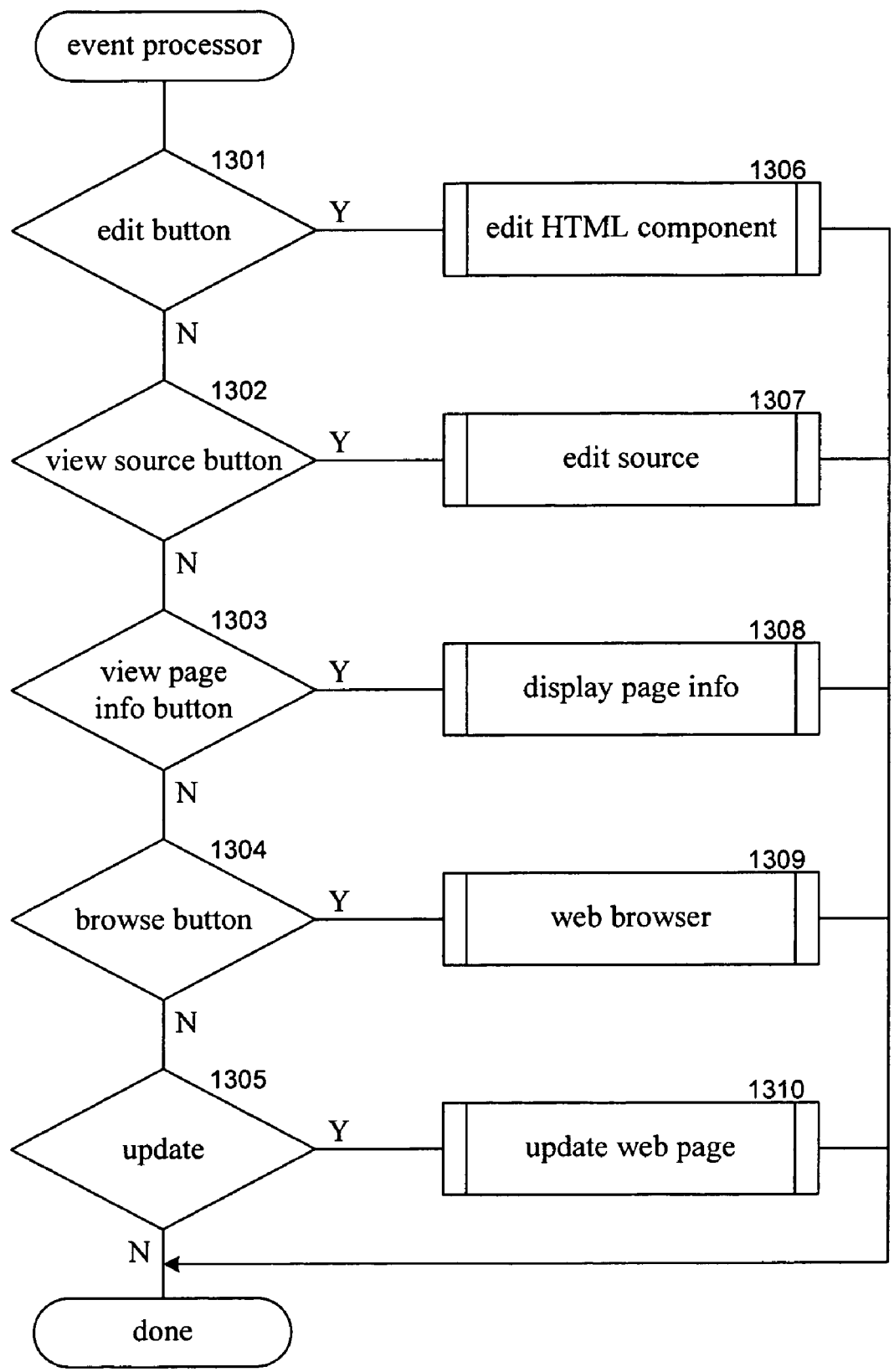
FIG. 13 is a flow diagram that illustrates the processing of an event processor of the editable web browser component of the client component in one embodiment.

FIG. 13 is a flow diagram that illustrates the processing of an event processor of the editable web browser component of the client component in one embodiment. The event processor processes user events that were not handled by an invoked component. For example, the browser plug-in would handle browse events. In decision blocks 1301-1305, the event processor determines which event has occurred. The event processor then invokes the appropriate component for processing the event in blocks 1306-1310. For example, if the user selected the edit this web page button, then the event processor would invoke the edit HTML component in block 1306. The component then returns.

Figure 14:
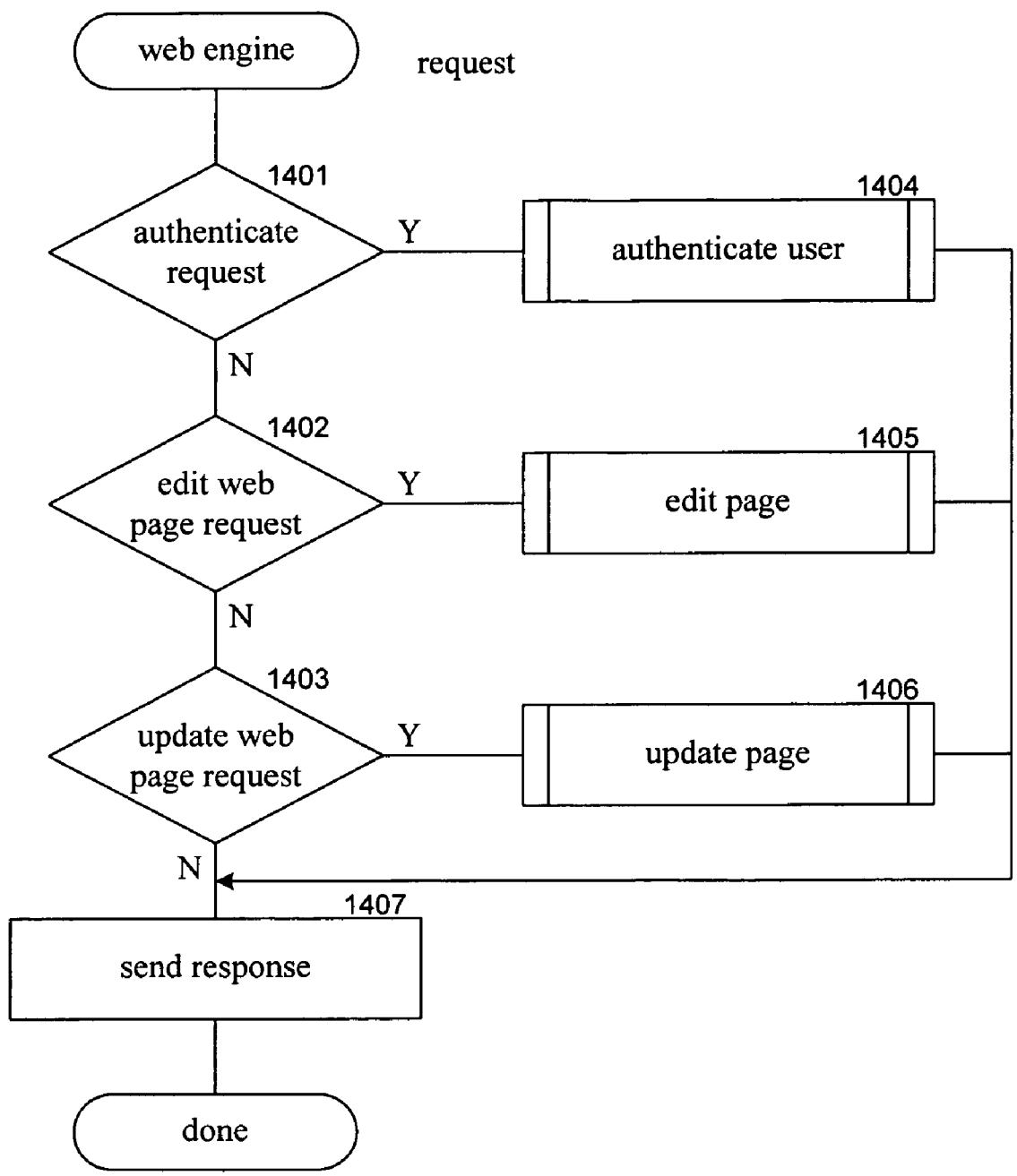
FIG. 14 is a flow diagram that illustrates the processing of a web engine of the server component in one embodiment.

FIG. 14 is a flow diagram that illustrates the processing of a web engine of the server component in one embodiment. The web engine receives requests from a user computer system, invokes the appropriate components for processing the requests, and then sends responses to the user computer system. In decision block 1401, if the request is to authenticate a user, then the component continues at block 1404 to invoke the authenticate user component and then continues at block 1407, else the component continues at block 1402. Alternatively, the authenticate user component may be invoked for each edit-related request to authenticate based on information included in each request. In decision block 1402, if the request is to edit a web page, then the component continues at block 1405 to invoke an edit web page component and then continues at block 1407, else the component continues at block 1403. In decision block 1403, if the request is to update a web page, then the component continues at block 1406 to invoke the update web page component and then continues at block 1407, else the component continues at block 1407. In block 1407, the component sends the appropriate response to the user computer system and then completes.

Figure 15:
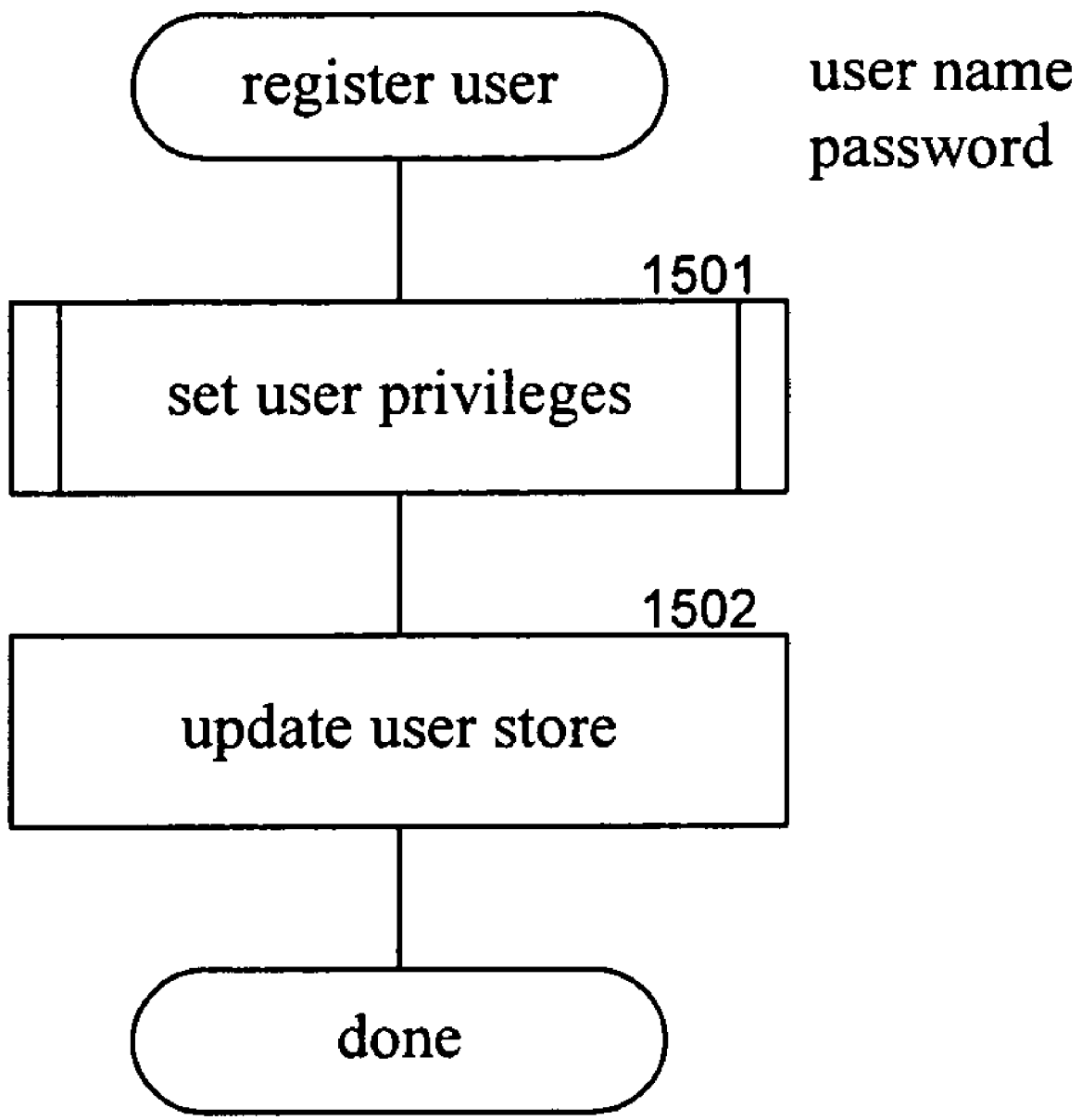
FIG. 15 is a flow diagram that illustrates the processing of a register user component of the server component in one embodiment.

FIG. 15 is a flow diagram that illustrates the processing of a register user component of the server component in one embodiment. The component is passed an indication of a user name and password. The component may be invoked when a web site administrator adds a user who will have edit rights to a web page. In block 1501, the component controls the setting of the user's edit rights to the web pages. The component may display a user interface that identifies the various web pages so that the administrator can select to which web pages the user will have edit rights. In block 1502, the component updates the user store with the user's authentication information and may update the web page edit store. The component then completes.

Figure 16:
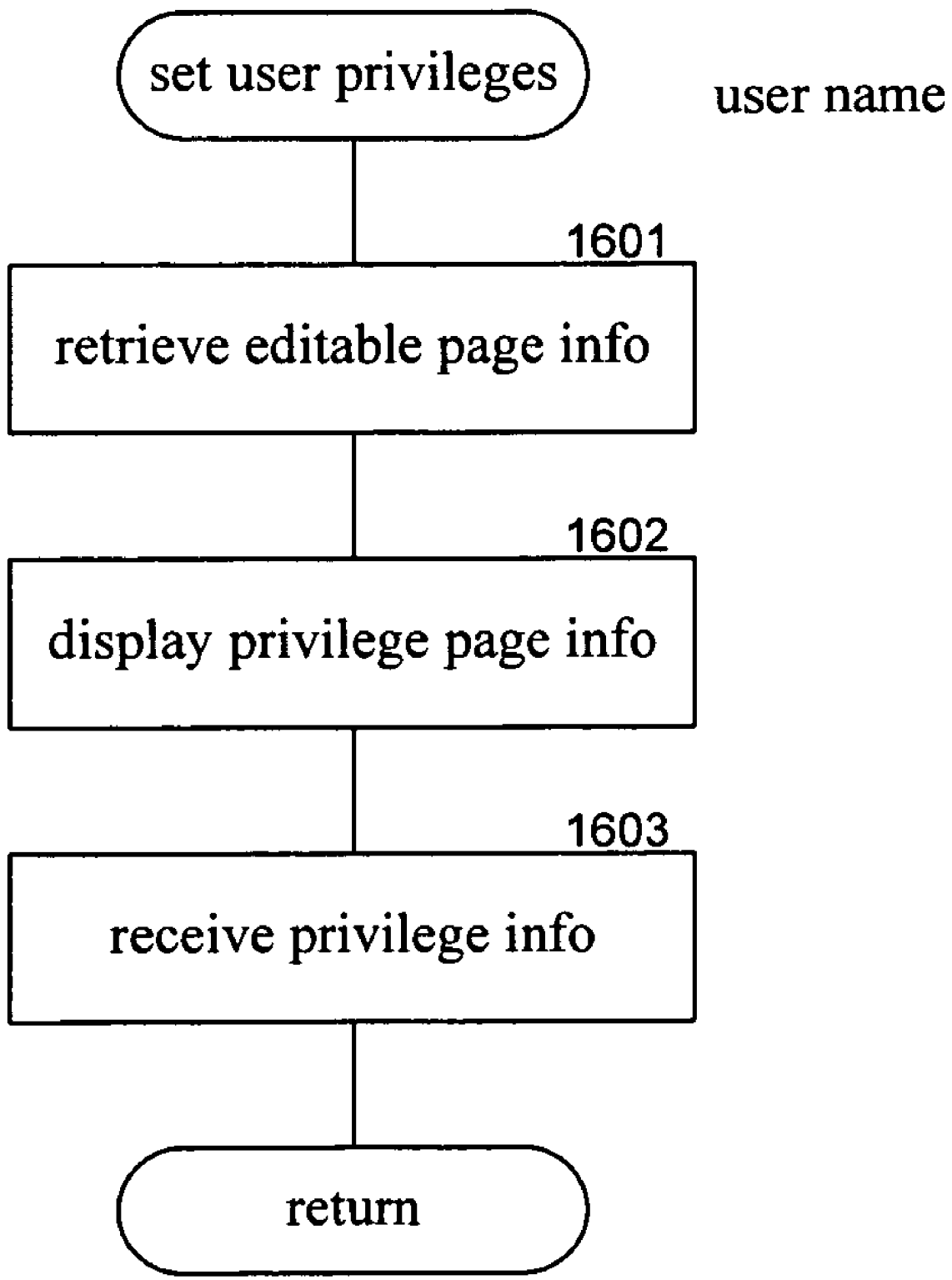
FIG. 16 is a flow diagram that illustrates the processing of a set user privileges component of the server component in one embodiment.

FIG. 16 is a flow diagram that illustrates the processing of a set user privileges component of the server component in one embodiment. The component is passed an indication of the user and that allows an administrator to specify the edit rights of that user to various editable web pages. In block 1601, the component retrieves information identifying the editable web pages. In block 1602, the component displays a display page indicating the editable web pages so that the web site administrator can specify the edit rights of the user to each web page. In block 1603, the component receives the edit rights information from the web site administrator and updates the web page edit store.

Figure 17:
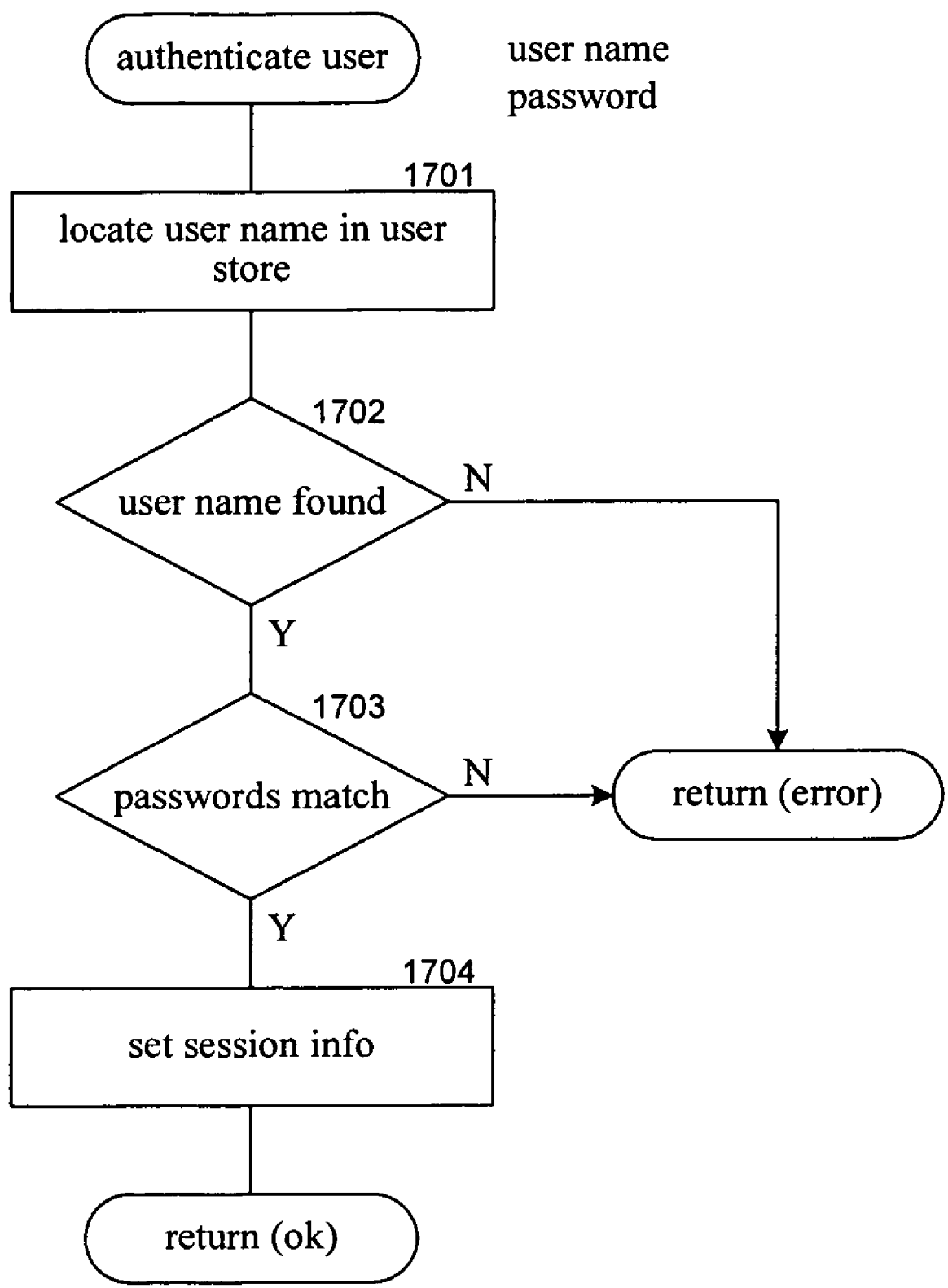
FIG. 17 is a flow diagram that illustrates the processing of an authenticate user component of the server component in one embodiment.

FIG. 17 is a flow diagram that illustrates the processing of an authenticate user component of the server component in one embodiment. The component is passed an indication of a user name and password and determines whether the user name and password combination are correct. In block 1701, the component retrieves the entry for the user name from the user store. In decision block 1702, if the user name entry was located, then the component continues at block 1703, else the component returns an error. In decision block 1703, if the passed password and the password of the retrieved entry match, then the component continues at block 1704, else the component returns an error. In block 1704, the component may establish an authentication certificate for the user and returns it so that subsequent requests by the user to the web site can include the authentication certificate to prove that the user has already been authenticated.

Figure 18:
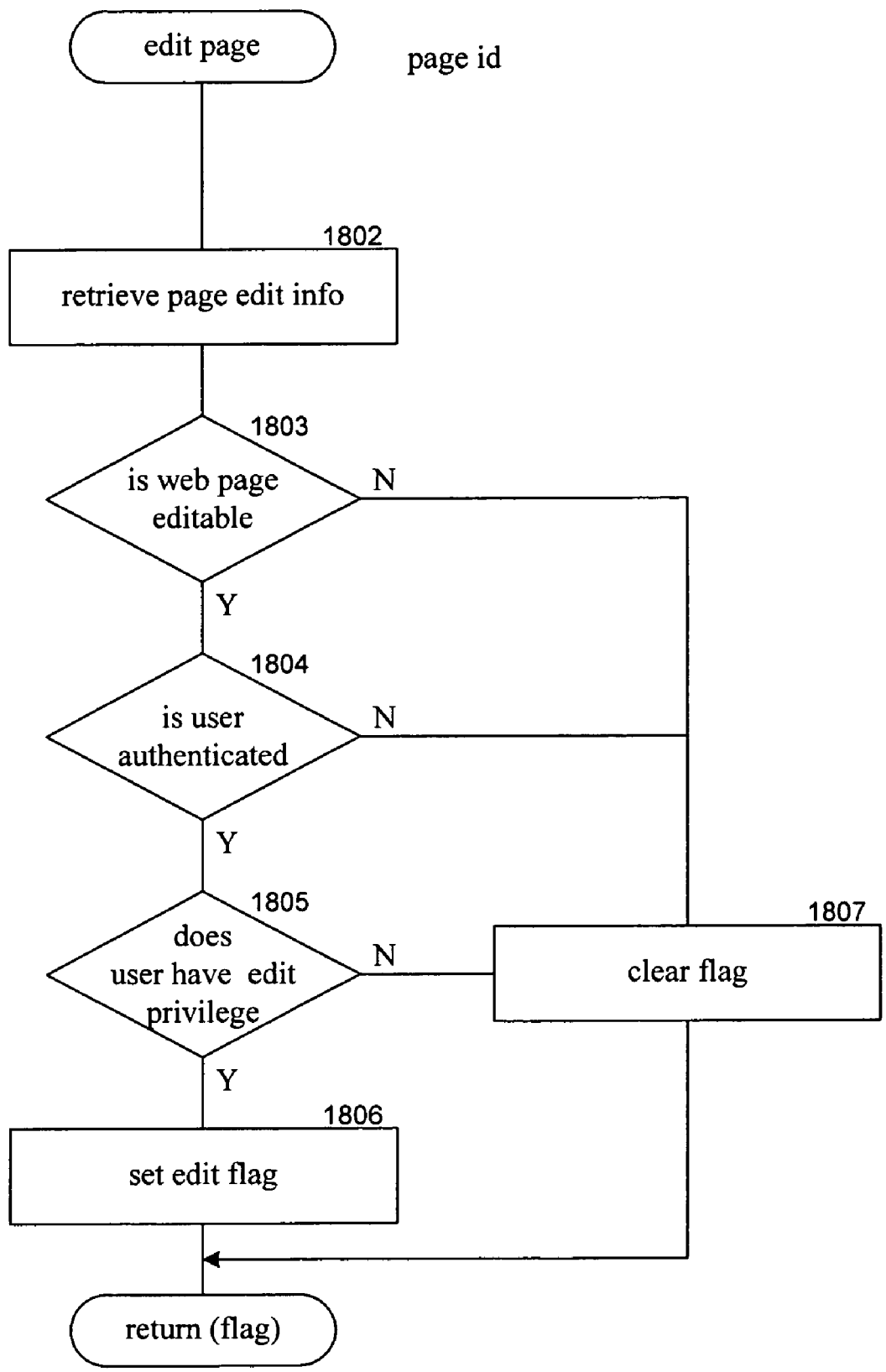
FIG. 18 is a flow diagram that illustrates the processing of a retrieve web page component of the server component in one embodiment.

FIG. 18 is a flow diagram that illustrates the processing of an edit web page component of the server component in one embodiment. The component is passed an indication of a web page and an indication of whether the web page is editable by the user. In block 1802, the component retrieves the edit information for this web page. In decision block 1803, if this web page is editable, then the component continues at block 1804, else the component continues at block 1807. In decision block 1804, if the authentication information is correct, then the component continues at block 1805, else the component continues at block 1807. Alternatively, the authentication information may be checked prior to invoking this component. In decision block 1805, if the user has edit privileges to this web page, then the component continues at block 1806 to set an edit flag and then returns, else the component continues at block 1807. The edit flag is sent to the client computer system so that the client component can determine whether a web page is editable by the user. In block 1807, the component clears the edit flag and returns.

Figure 19:
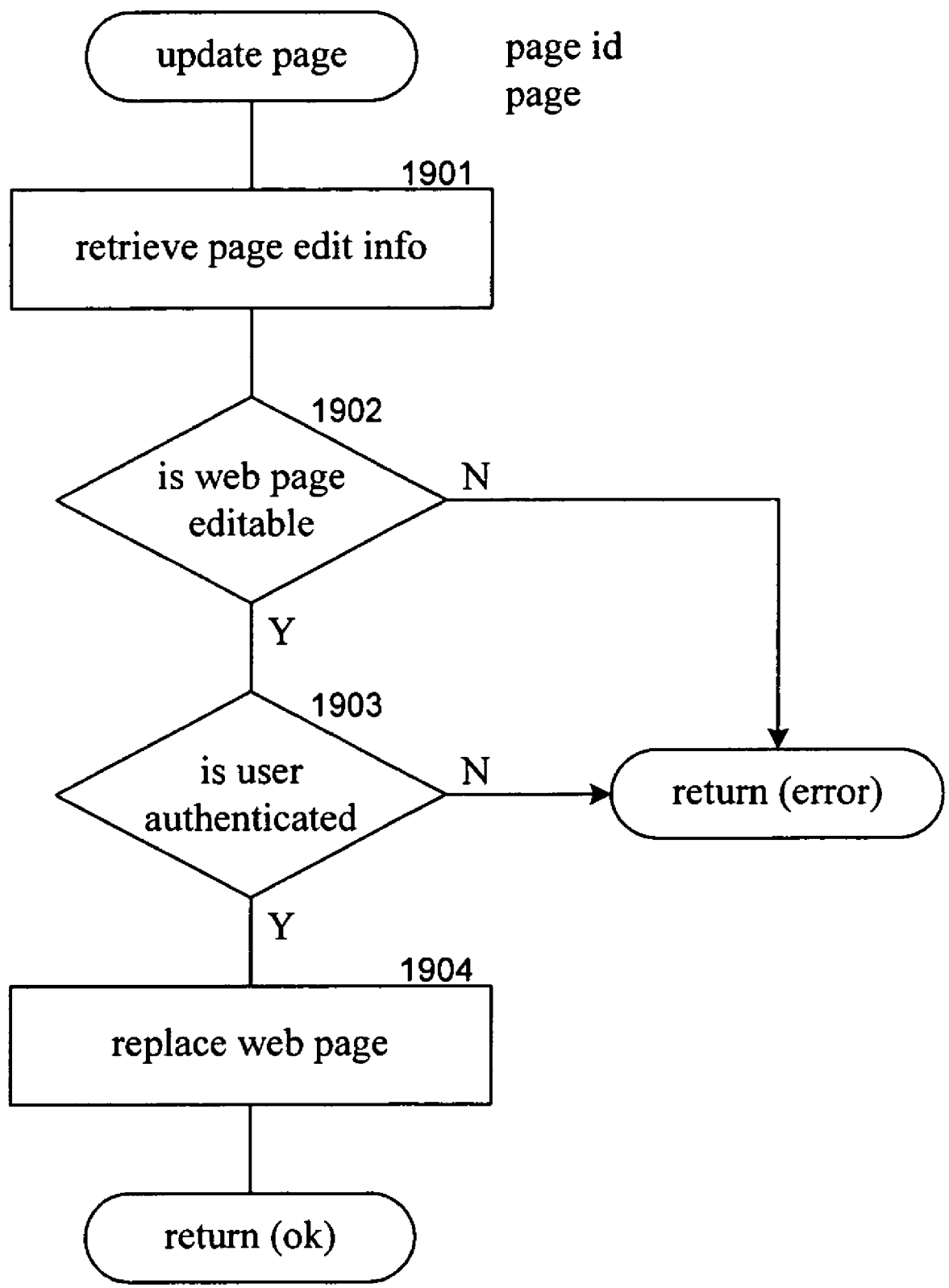
FIG. 19 is a flow diagram that illustrates the processing of an update web page component of the server component in one embodiment.

FIG. 19 is a flow diagram that illustrates the processing of an update web page component of the server component in one embodiment. The component is passed an indication of the authentication information, a web page identification, and a web page, which was received in an update package from a client component. In block 1901, the component retrieves the edit information for the web page. In decision block 1902, if this web page is editable, then the component continues at block 1903, else the component returns an error. In decision block 1903, if the authentication information is correct and the user has edit rights to the web page, then the component continues at block 1904, else the component returns an error. In block 1904, the component updates the web page and returns an indication of success. The updating of a web page may include updating of images that are available to be included in the web page and updating of the source (e.g., HTML).

One skilled in the art will appreciate that although specific embodiments of the editing system have been described herein for purposes of illustration, various modifications may be made without deviating from the spirit and scope of the invention. For example, the editing system may be used to edit any content that can be provided by a web server. A web server can serve web pages that include information stored in the format of a word processor, a spreadsheet program, a database program, plain text, HTML, XML/XHTML, and so on. The editable web browser component may have a separate edit control for each of these formats. Accordingly, the invention is not limited except by the appended claims.

We claim:

1. A method performed by a client system for retrieving authentication information for a user via a user-specific authentication web page, the method comprising:

receiving at the client system a user-specific link to a user-specific authentication web page created specifically for the user and that has authentication information of the user, the user-specific link specifically identifying the user-specific authentication web page of the user using information unique to the user;

sending a request for the user-specific authentication web page that is identified using the user-specific link that specifically identifies the user-specific authentication web page of the user;

in response to sending the request, receiving the user-specific authentication web page; and after receiving the user-specific authentication web page,
retrieving the authentication information from the user-specific authentication web page;
sending to a server a request for information, the request including the retrieved authentication information; and
receiving from the server the requested information after the server authenticates the user using the authentication information of the received request
wherein user-specific authentication web pages provide authentication information for each of a plurality of users.

2. The method of claim 1 wherein the authentication web page is in a markup language format and the authentication information is identified by a tag of the markup language.

3. The method of claim 1 wherein the authentication web page is requested by a user browsing to the authentication web page.

4. The method of claim 1 wherein the retrieving of authentication information from the user-specific authentication web page includes storing the authentication in a configuration file and later retrieving the stored authentication information from the configuration file.

5. The method of claim 1 wherein the authentication web page includes an identifier of the server.

6. The method of claim 5 wherein the identifier of the server is a URL.

7. The method of claim 1 wherein the requested information relates to editable web pages.

8. The method of claim 1 including storing the received information at the client system.

9. The method of claim 1 wherein the retrieving, sending, and receiving are performed without user intervention.

10. The method of claim 1 wherein the requesting of the user-specific authentication web page does not include user-entered authentication information.

11. A computer system with a processor and memory for retrieving authentication information via a user-specific authentication web page, comprising:

a first component for requesting a user-specific authentication web page created specifically for a user and that has authentication information of the user, the user-specific authentication web page being requested using a link that specifically identifies the user-specific authentication web page using information unique to the user but not entered by the user; and a second component that retrieves authentication information from the user-specific authentication web page, sends to a server a request for information that includes the retrieved authentication information, and receives from the server the requested information when the server authenticates the user based on the sent authentication information wherein the components are implemented as computer-executable instructions stored in the memory for execution by the processor and wherein the computer system is a client computer system.

12. The computer system of claim 11 wherein the authentication web page is in a markup language format and the authentication information is identified by a tag of the markup language.

13. The computer system of claim 11 wherein the first component for requesting is a browser.

14. The computer system of claim 11 wherein the authentication web page includes an identifier of the server.

15. The computer system of claim 14 wherein the identifier of the server is a URL.

16. A method in a server for providing authentication information to a client, the method comprising:

generating for a user a user-specific authentication web page that includes authentication information of that user that is not displayable;

sending to the client a user-specific link that identifies the user-specific authentication web page using a unique identifier of the user;

upon receiving from the client a request that includes the user-specific link that identifies the user-specific authentication web page for the user, sending to the client the generated user-specific authentication web page that is referenced by the user-specific link of the request, the sent user-specific authentication web page including authentication information that is not displayable; and upon receiving from the client a request for information that includes the authentication information of the sent user-specific authentication web page, verifying the authentication information; and upon verification, sending to the client the requested information.

17. The method of claim 16 wherein the authentication web page is in a markup language format and the authentication information is identified by a tag of the markup language.

18. The method of claim 16 wherein the authentication web page is requested by a user browsing to the authentication web page.

19. The method of claim 18 wherein the authentication web page includes an identifier of the server.

20. The method of claim 19 wherein the identifier of the server is a URL.

21. The method of claim 16 wherein the requested information relates to editable web pages.

22. A method performed by a client system for retrieving authentication information for a user, the method comprising:

receiving a user-specific link that identifies a user-specific authentication web page created specifically for the user and that has authentication information of the user, the user-specific link identifying the user using information unique to the user;

receiving from the user a request to retrieve the user-specific authentication web page identified by the user-specific link;

sending to a first server a request for the user-specific authentication web page using the user-specific link;

receiving from the first server, in a response to the request, the user-specific authentication web page that has authentication information of the user;

upon receiving the user-specific authentication web page, retrieving the authentication information from the user-specific authentication web page; and storing the retrieved authentication information in a configuration file;

retrieving the stored authentication information from the configuration file;

sending to a second server a request for information, the request including the retrieved authentication information so that the second server can authenticate the user using the authentication information; and receiving from the second server the requested information when the second server authenticates the user using the authentication information wherein the authentication information is automatically provided to the client system when the user browses to the user-specific authentication web page.

23. The method of claim 22 wherein the first server and the second server are implemented on the same computer system.

24. The method of claim 22 wherein the user-specific authentication web page includes a link to the second server and the sending to the second server sends the request in accordance with the link.

25. The method of claim 22 wherein the user-specific link is received via an electronic mail message.

26. The method of claim 22 wherein authentication information of the user is not sent to the first server.

* * * * *

UNITED STATES PATENT AND TRADEMARK OFFICE
CERTIFICATE OF CORRECTION

PATENT NO. : 7,716,352 B2
APPLICATION NO. : 10/830869
DATED : May 11, 2010
INVENTOR(S) : Kalev Leetaru et al.

It is certified that error appears in the above-identified patent and that said Letters Patent is hereby corrected as shown below:

In column 1, line 43, delete "Uniforn" and insert -- Uniform --, therefor.

Signed and Sealed this

Sixth Day of July, 2010

David J. Kappos
*Director of the United States Patent and Trademark Office*